US012640917B1

(12) United States Patent
Ling

(10) Patent No.: US 12,640,917 B1
(45) Date of Patent: May 26, 2026

(54) QUANTUM KEY DISTRIBUTION NETWORK MANAGEMENT SERVICE

(71) Applicant: Amazon Technologies, Inc., Seattle, WA (US)

(72) Inventor: Xinhua Ling, Rockville, MD (US)

(73) Assignee: Amazon Technologies, Inc., Seattle, WA (US)

( * ) Notice: Subject to any disclaimer, the term of this patent is extended or adjusted under 35 U.S.C. 154(b) by 16 days.

(21) Appl. No.: 18/753,829

(22) Filed: Jun. 25, 2024

(51) Int. Cl.
H04L 9/08 (2006.01)

(52) U.S. Cl.
CPC .................................. H04L 9/0852 (2013.01)

(58) Field of Classification Search
CPC . H04L 9/0852; H04L 9/0855; H04L 63/0464; H04L 9/0858; H04L 9/085
See application file for complete search history.

(56) References Cited

U.S. PATENT DOCUMENTS

| | | | | |
|---|---|---|---|---|
| 7,512,242 | B2 * | 3/2009 | Pearson | H04L 9/0855 380/278 |
| 7,889,868 | B2 | 2/2011 | Wellbrock et al. | |
| 8,082,443 | B2 * | 12/2011 | Troxel | H04L 9/0852 380/278 |
| 8,433,070 | B2 * | 4/2013 | Habif | H04B 10/70 380/278 |
| 8,488,790 | B2 | 7/2013 | Wellbrock et al. | |
| 9,876,639 | B2 * | 1/2018 | Choi | H04L 9/0858 |
| 10,305,873 | B2 | 5/2019 | Fu | |
| 10,348,493 | B2 | 7/2019 | Fu | |
| 11,164,104 | B2 * | 11/2021 | Ashrafi | H10N 99/05 |
| 11,387,913 | B2 * | 7/2022 | Innes | H04L 9/0833 |
| 11,424,911 | B2 * | 8/2022 | Narayanaswami | H04L 63/1416 |
| 12,052,352 | B2 * | 7/2024 | Richdale | H04L 9/0855 |
| 12,170,725 | B2 * | 12/2024 | Trost | H04L 9/0852 |

OTHER PUBLICATIONS

U.S. Appl. No. 18/759,309, filed Jun. 28, 2024, Xinhua Ling.
U.S. Appl. No. 18/759,540, filed Jun. 28, 2024, Xinhua Ling.
"Overview on networks supporting quantum key distribution", ITU-T Recommendation Y.3800 (2019) Cor. 1, Apr. 2020, pp. 1-22.

(Continued)

*Primary Examiner* — Hosuk Song
(74) *Attorney, Agent, or Firm* — Alexander A. Knapp; Kowert, Hood, Munyon, Rankin & Goetzel, P.C.

(57) ABSTRACT

A system and method enabling a management service to dynamically select a key relay technique between at least a first relay technique that uses more quantum key distribution (QKD) bits and a second relay technique that uses less QKD key bits and select a path for relaying a key between a source QKD node and a destination QKD node. Respective QKD nodes may relay information about QKD key bit inventory to the management service, wherein the management service may store respective data in a repository. Management service may receive a request for distribution of a QKD key and select one or more key relay techniques to relay the key at respective QKD node links. Additionally, the management service may dynamically select and optimize the relay path and the key relay technique for respective links based on QKD key bit information.

20 Claims, 16 Drawing Sheets

Management Service 102

Repository 104

| Pair | Inventory | Rate | Demand |
|------|-----------|------|--------|
| SA | $I_{SA}$ | $R_{SA}$ | $D_{SA}$ |
| SB | $I_{SB}$ | $R_{SB}$ | $D_{SB}$ |
| SX | $I_{SX}$ | $R_{SX}$ | $D_{SX}$ |
| : | : | : | : |

Data 106

114
Request for distribution of a Quantum Key Distribution (QKD) key

Path Selection 108

Key relay technique selection 110
• First key relay technique
• Second key relay technique
• Other key relay technique
:

Path/Key Relay Optimization 112

(56) References Cited

OTHER PUBLICATIONS

"Quantum Key Distribution (QKD): Protocol and data format of REST-based key delivery API", ETSI GS QKD 014 v1.1.1, Feb. 2019, pp. 1-22.

A. Gubrandsen, et al., "A DNS RR for specifying the location of services (DNS SRV)", RFC 2782, Microsoft Corp. Feb. 2000, pp. 1-12.

"Quantum key distribution networks—Control and management, Amendment 1", ITU-T Recommendation Y.3804 (2020) Amd. 1, Nov. 2023, pp. 1-38.

"AWS Direct Connect User Guide," 2024 Amazon Web Services, Inc., https://docs.aws.amazon.com/directconnect/latest/UserGuide/Welcome.html#overview-components, pp. 1-6.

Toshiba, Quantum Technology, "Flexible QKD System LE," <https://www.toshiba.eu/quantum/products/quantum-key-distribution/flexible-qkd-system-le/>, 2023 Toshiba Europe Limited, pp. 1-7.

Bernd Frohlich, et al., "A quantum access network" Nature 501, pp. 69-72, 2013 <https://www.nature.com/articles/nature12493>, retrieved from arXiv:1309.6431v1.

"HSBC pioneers Quantum protection for AI-powered FX trading," HSBC/BT/Toshiba PR, HSBC Press Release 1, Dec. 2023, pp. 1-3.

"HSBC becomes first bank to join the UK's pioneering commercial quantum secure metro network," HSBC/BT/Toshiba PR, HSBC Press Release Jul. 2, 2023, pp. 1-4.

"Quantum key distribution networks—Functional Architecture, Amendment 1", ITU-Publications Recommendation Y.3802 (2020), Amd. Nov. 10, 2023, pp. 1-34.

Claude E. Shannon, "Communication theory of secrecy systems," Bell system technical journal, vol. 28-4, pp. 656-715, Oct. 1949.

"Advanced Encryption Standard (AES)," NIST FIPS 197, pp. 1-46 Nov. 2001 (updated May 2023).

Morris Dworking, "Recommendation for block Cipher Modes of Operation: Methods for Key Wrapping," NIST SP 800-38F, pp. 1-32.

Cita Furlani, "The Keyed-Hash Message Authentication Code (HMAC)," NIST FIPS PUB-1, Jul. 2008, pp. 1-13.

AWS re:Invent 2023, Practical Implementations of quantum communications networks (QTC204), https://www.youtube.com/watch?v=4ScolUaikME, 2023, pp. 1-4.

* cited by examiner

FIG. 2D

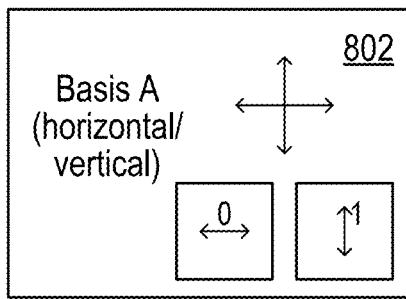
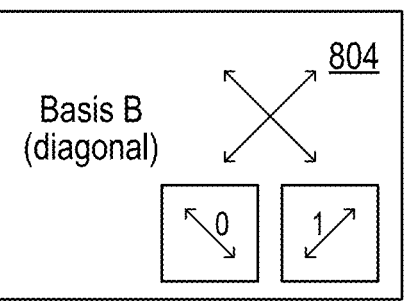
| Recipient QKD node A measurement and basis | | | | | | 806 |
|---|---|---|---|---|---|---|
| Time: | 1 | 2 | 3 | 4 | 5 | ... N |
| Node A Basis: | ↔ | ↔ | ⤬ | ↔ | ⤬ | ... ↔ |
| Node B Basis: | ⤬ | ↔ | ⤬ | ↔ | ↔ | ... ↔ |
| Same Basis? | - | ✓ | ✓ | ✓ | - | ... ✓ |
| Node A Result: | 0 ↔ | 0 ↔ | 1 ⤢ | ↕ 1 | 0 ⤡ | ... ↕ 1 |
| Node A's Knowledge Of Node B's Result: | ? | 0 ↔ | 1 ⤢ | ↕ 1 | ? | ... ↕ 1 |
| Resulting QKD Bit: | | 0 | 1 | 1 | | ... 1 |
FIG. 8

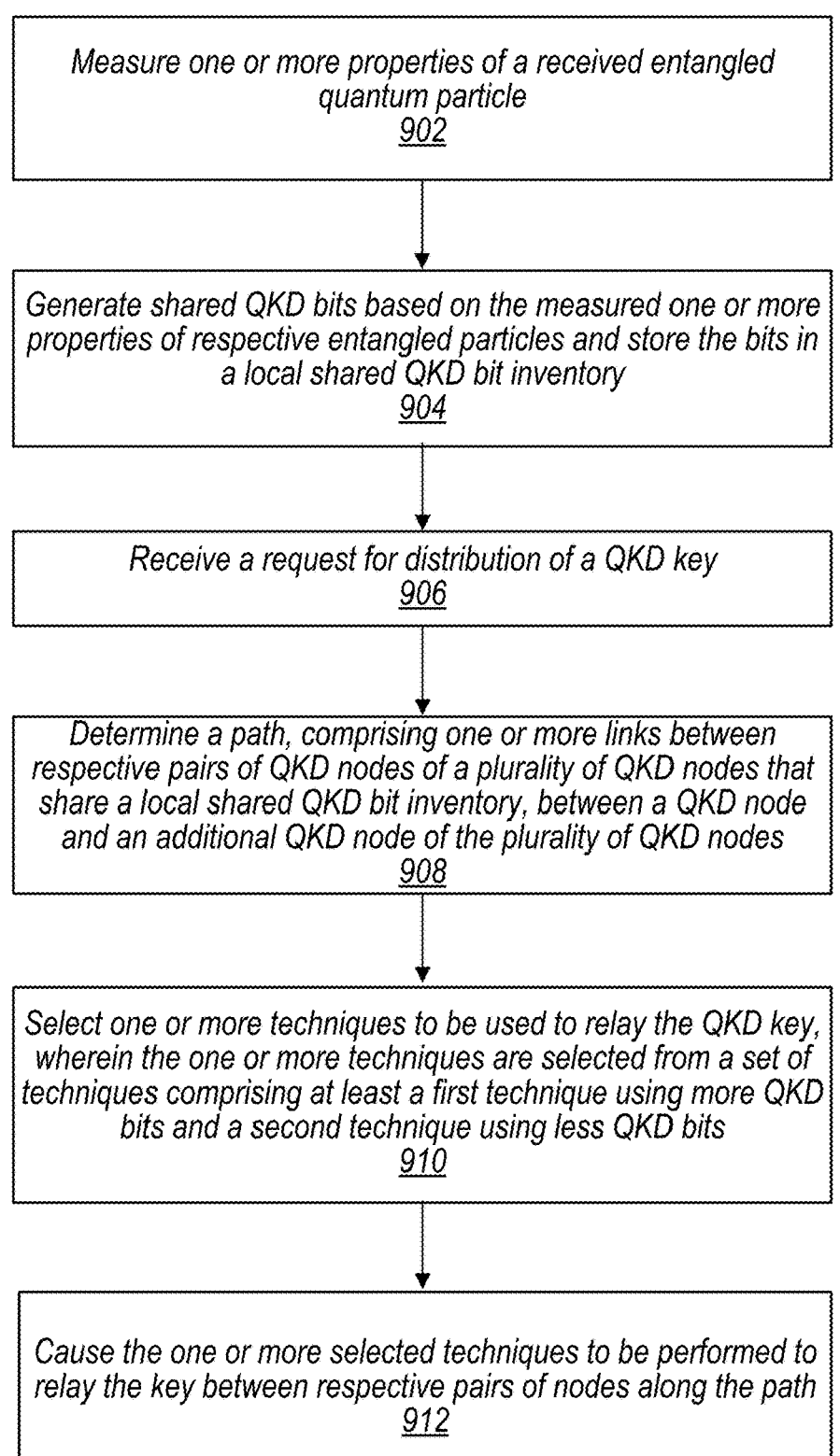

*Measure one or more properties of a received entangled quantum particle*
*902*

*Generate shared QKD bits based on the measured one or more properties of respective entangled particles and store the bits in a local shared QKD bit inventory*
*904*

*Receive a request for distribution of a QKD key*
*906*

*Determine a path, comprising one or more links between respective pairs of QKD nodes of a plurality of QKD nodes that share a local shared QKD bit inventory, between a QKD node and an additional QKD node of the plurality of QKD nodes*
*908*

*Select one or more techniques to be used to relay the QKD key, wherein the one or more techniques are selected from a set of techniques comprising at least a first technique using more QKD bits and a second technique using less QKD bits*
*910*

*Cause the one or more selected techniques to be performed to relay the key between respective pairs of nodes along the path*
*912*

FIG. 9

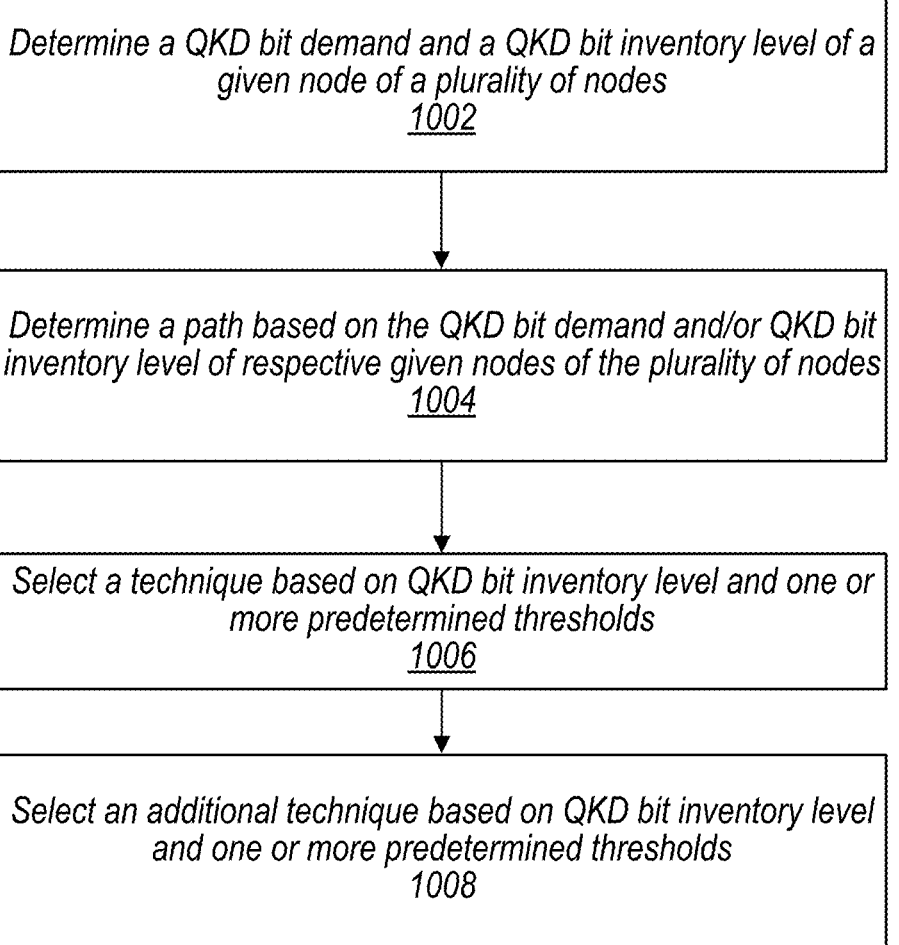

*Determine a QKD bit demand and a QKD bit inventory level of a given node of a plurality of nodes*
*1002*

*Determine a path based on the QKD bit demand and/or QKD bit inventory level of respective given nodes of the plurality of nodes*
*1004*

*Select a technique based on QKD bit inventory level and one or more predetermined thresholds*
*1006*

*Select an additional technique based on QKD bit inventory level and one or more predetermined thresholds*
*1008*

FIG. 10

Determine a QKD bit use rate of a given node of a plurality of nodes
1102

Determine a path based on QKD bit use rate of respective given nodes of the plurality of nodes
1104

Select a technique based on QKD bit use rate and one or more predetermined thresholds
1106

Select an additional technique based on QKD bit use rate and one or more predetermined thresholds
1108

QUANTUM KEY DISTRIBUTION NETWORK MANAGEMENT SERVICE

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects (e.g., particles) like photons, molecules, atoms, and electrons.

A quantum computing device is a device that utilizes quantum mechanics to allow one to write, store, process and read out information encoded in quantum states, e.g., the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers, where the absolute square of the complex numbers must sum to one. Each of the two numbers is called a probability amplitude, or quasi-probability. The absolute square of each of the two complex numbers corresponds to the probability that event zero and event one will happen, respectively. A fundamental and counterintuitive difference between a probabilistic bit (e.g., a traditional zero or one bit) and the qubit is that a probabilistic bit represents a definite state of a two-level classical system, while a qubit contains information about a two-level quantum system corresponding to a probability of measuring the system to be in one state or the other.

Quantum computing devices are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

BRIEF DESCRIPTION OF THE DRAWINGS

FIG. 2D illustrates an example of a management service used for relaying a QKD key between a source QKD node and a destination QKD node of a plurality of QKD nodes of a QKD network, wherein the management service selects a relay technique and an additional relay technique to be used to relay a QKD key between QKD nodes/KMEs, according to some embodiments.

FIG. 8 illustrates an example of measurement information of a distributed quantum entanglement maintained by key manager A, according to some embodiments.

FIG. 9 is a flowchart illustrating an example of a method for relaying a key between nodes selected from a plurality of nodes in a quantum key distribution (QKD) network, according to some embodiments.

FIG. 10 is a flowchart illustrating an example of determining a path and selecting a relay technique for relaying a QKD key from a source node to a destination node of a plurality of nodes in a QKD network, wherein determining the path and selecting the relay technique are based on QKD key bit inventory level and QKD key bit demand, according to some embodiments.

Figure 1:
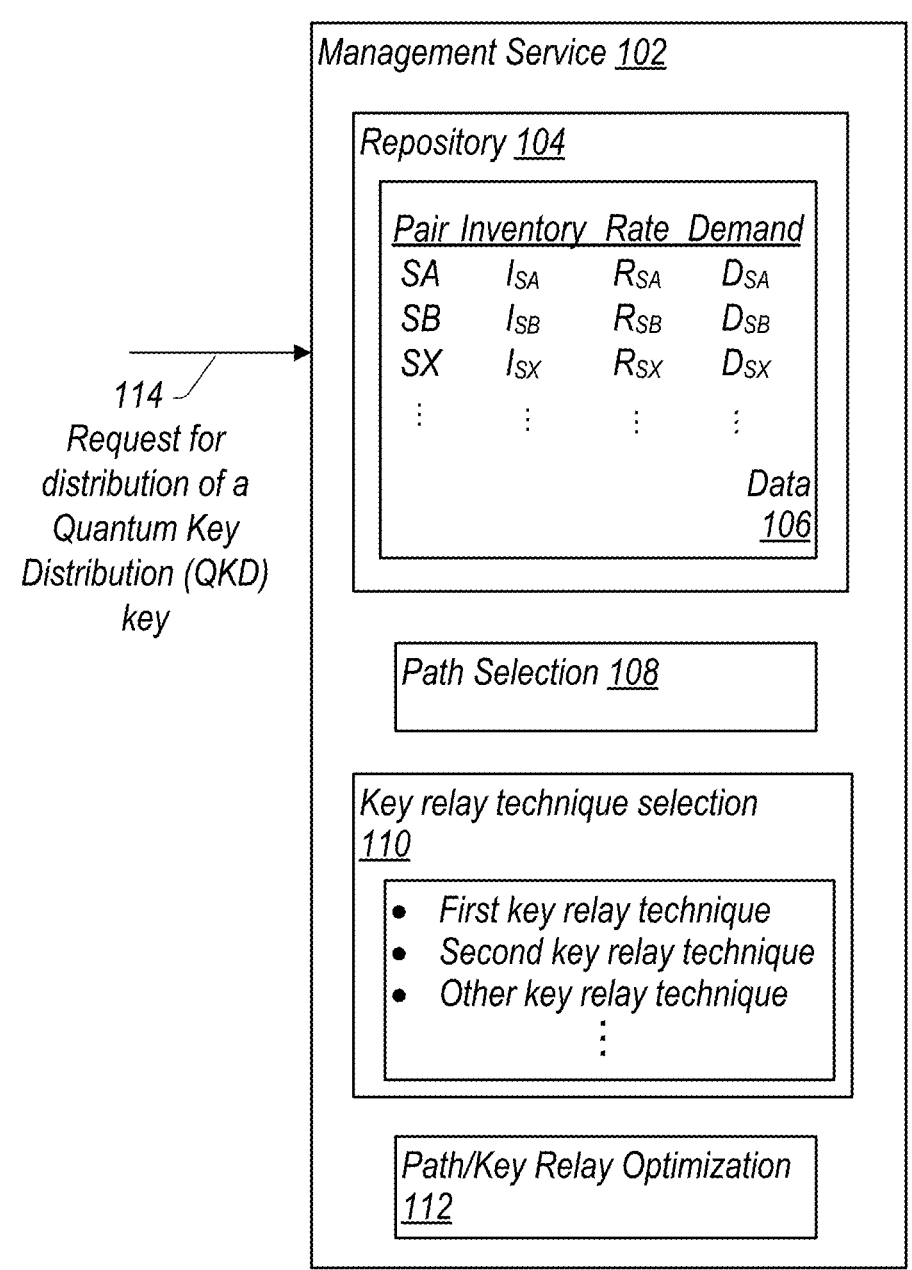
FIG. 1 illustrates an example of a management service used for relaying a quantum key distribution (QKD) key between a source QKD node and a destination QKD node, wherein the management service receives a request for distribution of a QKD key, selects a path for relay of the key, and selects one or more relay techniques to be used to relay the QKD along the path, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including" and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and systems for enabling secure communications using quantum key distribution (QKD) keys, wherein enabling the secure communications may include a management service configured to select a key relay technique and a key relay path for distributing shared secrets (e.g., QKD keys) between a source node and a destination node while ensuring confidentiality and integrity of the shared secret being distributed (e.g., the QKD key being distributed). QKD key bits may be continuously generated between QKD nodes that are not directly connected and/or QKD key bits may be generated based on a request by a user. The management service may select a relay technique to be used between a given set of QKD nodes of a QKD network based on QKD key bit inventory information and predetermined thresholds related to QKD key bit inventory levels and/or consumption rates. A relay technique using more bits may be selected when a bit inventory is greater than or equal to a predetermined threshold. A relay technique using less bits may be selected when a bit inventory is less than or equal to another predetermined threshold. A key relay technique may also be chosen based on a net key consumption rate, wherein the net key consumption rate may be a raw QKD key bit generation rate of a QKD key bit inventory minus a QKD key bit consumption rate caused by key forwarding. In some embodiments, different techniques may be selected for different hops along a distribution path based on varying inventory levels of the QKD nodes included in the distribution path. In some embodiments, a mapping service may be implemented using a centralized architecture or a distributed architecture, wherein respective QKD nodes have a control plane function that works beside or within a key manager.

In some embodiments, quantum key distribution (QKD) networks may rely on trusted nodes to enable a source QKD node that is not directly connected to a destination node by a QKD link to share secret keys. More specifically, a source QKD node S relies on one or more intermediate trusted nodes to relay a to-be-shared-key to a destination QKD node D, on a hop-by-hop fashion along a path connecting them. This key relay (or key forwarding or key transfer) operates at an "overlay network" layer that overlays a traditional packet-based communication layer. For example, QKD nodes used to distribute QKD keys include specialized hardware configured to measure entangled particles and pass on measurement results to classical computing devices. Routing path selection between a given source and destination nodes pair S and D may be deemed as a control plane task, while key forwarding over the hops may be deemed as a data plane task. The control plane functions (e.g., routing) may be implemented in either a centralized (e.g. software defined network (SDN) based configuration) or a distributed architecture and may control the data plane operations elaborated below.

In some embodiments, a QKD network provides shared secrets (to be used as cryptographic keys by the users) in a secure way. In some embodiments, various QKD network design and implementation options may be used. One option of a confidentiality protection mechanism that may be utilized for key forwarding over a given hop is the one-time pad (OTP). Another option for secure protection in key forwarding is encrypting a key using shared QKD key bits, such as "key-wrapping." One example method of key-wrapping that may be used is the advanced encryption standard (AES) key wrapping (AES-KW) mode, wherein AES-KW may protect both confidentiality and authenticity/integrity of the to-be-shared-key over a given hop for which key-wrapping is used. However, there are different trade-offs to consider when selecting a key forwarding technique to be used for a given hop. For example, a one-time pad (OTP) (1) requires a key of m bits to protect a message (e.g., the to-be-shared-secret) of m bits; and (2) only protects confidentiality. Thus, when using an OTP key forwarding technique, a separate data integrity protection method utilizing an x-bit key different from the OTP key is used together with the "m bits" used in key forwarding. Consequently, a total of (m+x) bits of QKD key material over one hop is needed for secure key forwarding, when using the OTP key forwarding technique. In contrast, key-wrapping, such as AES-KW, requires a key encryption key (KEK) of length y (e.g., y=128 or 256) bits, which may be smaller than the length m of the to-be-shared-key. As an example, suppose a selected routing path for the nodes pair S and D comprises h hops, and the length of the to-be-shared-key is m bits. A successful key establishment between the node S and node D pair via key forwarding using the OTP option (if used for every hop) will consume a total of $(h-1)*(m+x)$ bits of QKD keys along the path, while the AES-KW option (if used for every hop) will consume $(h-1)*y$ bits, where usually y is less than $(m+x)$. Note that using $(h-1)$ above instead of h is due to the fact that usually the first hop from S to its immediate downstream neighbor node A does not perform the normal key forwarding operation. For example, node A may use m bits of QKD key bits already shared with node S as the to-be-shared-key for node S and node D. In key forwarding, the consumed QKD key bits over the hops are no longer usable (e.g. whether using OTP or KW). Note also that for any one hop between a pair of directly connected nodes, (e.g. node A and node B), it is likely a common hop of multiple partially overlapped paths for different source-destination pairs (e.g., node pair S and D, and node pair X and Y in FIG. 6) in the QKD network. Thus, more of the QKD keys shared between node A and B will inevitably be consumed by key forwarding for multiple node pairs.

In some embodiments, a secure key rate $R_{user}$ (measured in bits/second) offered by a current-generation QKD network may not meet the expectations of a user. QKD technologies may provide point-to-point secure key rate $R_{link}$ up to a few tens or hundreds of kilobytes per second (kbps) over a direct QKD link. A length of the direct QKD link may be up to a few tens of kilometers. In general, the secure key rate offered may be less than the provided point-to-point secure key rate (e.g., $R_{user}$<min ({$R_{link}$ along the path between node S and node D})). This may be because the QKD network internal key forwarding consumes part of $R_{link}$ over each hop. Furthermore, $R_{link}$ may fluctuate due to some factors such as temperature around the QKD devices and/or the optical fiber connecting them. Therefore, in practice, $R_{user}$ for a pair of QKD network nodes may be lower than a few kbps. In some embodiments, users of QKD keys may have a high secure key rate demand that needs to be met constantly (e.g., due to a service level agreement (SLA)). One solution to meet a service level agreement (SLA) is over-provisioning, meaning to deploy more QKD systems for each hop, especially the less capable ones. But this means more hardware/software expenses, higher system complexity and higher operational costs, which may not be acceptable or available due to various constraints. In some embodiments, a management service may dynamically select between a technique to relay a key that uses more bits and a technique to relay a key that uses less bits, while guaranteeing that customer service-level agreements (SLAs) are met.

In some embodiments, the internal key consumption with key wrapping is lower than OTP for key forwarding. Thus, the QKD network may relay a key with key wrapping when user demands cannot be met at a desired level. Otherwise, OTP for key forwarding may be used. To balance a goal of meeting user demands and QKD key bits available, a management service may dynamically select key relay modes to be used for a QKD network. Depending on a local bit inventory level of a QKD node of QKD key bits shared with a downstream trusted node, and a corresponding bit consumption level for forwarding keys over the downstream link, the control plane function may dynamically change the key relay mode between a first technique that uses more bits and a second technique that uses less bits (e.g. OTP and key wrapping modes). Note that OTP and key wrapping modes are described herein as example key forwarding techniques. However, in various embodiments other key forwarding techniques may be included in a set of key-forwarding techniques from which a key manager selects given key forwarding techniques to be used for given hops of a key distribution path.

In some embodiments, when a local bit inventory level of QKD keys I is greater than or equal to a pre-determined threshold $L_1$, the key forwarding will operate in a first relay mode that uses more bits. Furthermore, in some embodiments, when the net key consumption rate C is less than or equal to a predetermined threshold $C_1$, the key forwarding will operate in a first relay mode that uses more bits. The net key use rate may be the raw QKD key bit generation rate along a QKD link minus a key use rate caused by key forwarding. In some embodiments, the relationship of the inventory-based condition and the net key use rate-based condition may both be satisfied and in other embodiments, one or the other condition may be satisfied.

In some embodiments, when the local inventory level of QKD key bits I is less than or equal to another pre-determined threshold $L_2$, the key forwarding over a given hop may operate with the key wrapping mode. Furthermore, this condition may be further combined with a net key consumption rate condition (e.g., when the net key consumption rate C is greater than or equal to another pre-determined threshold $C_2$). In some embodiments, the relationship of the inventory-based condition and the net key use rate-based condition may both be satisfied and in other embodiments, one or the other condition may be satisfied. Furthermore, the thresholds may not be the same (e.g., $L_1$ does not necessarily equal to $L_2$, and $C_1$ does not necessarily equal to $C_2$) to avoid frequent oscillation between the two modes. In some embodiments, a control plane function may include mechanisms to acquire/receive near real time values of I and C from each QKD node, at a predefined configurable update frequency f.

The present disclosure further relates to distributing QKD keys between applications to enable secure communication (such as encrypted communication, and communication to ensure integrity of a message) between applications. For example, QKD networks may provide generated keys to key consumer applications (such as link encryptors, routers or software applications etc.) in a supported user network upon request, wherein the keys are provided to the applications via a QKD key request/response application programming interface (API) of a key manager that services the respective applications.

In some embodiments, a procedure for providing QKD keys to applications is outlined as follows: 1) The key consumer, (e.g., application A), sends a request to its associated key manager (e.g., key manager A) to get a QKD key to be used to perform secure communication between application A and another application (e.g., application B). The request contains information such as the identity of application B, the number of QKD keys requested, and the length of QKD keys. 2) Key manager A and a key manager associated with application B (e.g., key manager B) decide on the QKD keys and respective QKD key identifier. 3) Key manager A provides the requested QKD key(s) and respective identifier(s) of the respective QKD key(s) to application A. 4) Application A stores the QKD key(s) locally and sends the QKD key identifier to application B. 5) Application B sends a request to key manager B to provide the QKD key(s) associated with the QKD key identifier(s). 6) Key manager B provides the QKD key(s) to application B. 7) Application A and application B use the now shared QKD key(s) to secure communication.

In some embodiments, applications may be a security application entity (SAE). In some embodiments, applications may be a cryptographic application. Furthermore, in some embodiments, applications may be a device comprising one or more computing devices comprising one or more processors. In some embodiments key managers may be key management entities (KMEs). In some embodiments key managers may be devices that manage keys for applications.

In some embodiments, QKD key bits may be generated between linked QKD nodes by way of utilizing continuous and/or discrete variables of a quantum mechanical system. Some methods of generating QKD key bits include continuous variable quantum key distribution (CV QKD), wherein continuous variables of quantum states such as amplitude and phase are used to encode information. Other methods of generating QKD key bits include discrete variable quantum key distribution (CV QKD), wherein discrete variables of quantum states such as photon polarization and photon count are used to encode information. QKD key bit generation methods may include but are not limited to include entanglement of quantum states.

In some embodiments, pairs of entangled particles may be emitted such that a respective one of the pair is received at two different endpoints (e.g., key managers Alice and Bob). Key managers may then perform measurements in respective measurement bases on the received halves of the entangled particles. The key managers may then exchange measurement basis information such that either one (or both) of the key managers are aware of a measurement basis used by the other during a given quantum particle measurement. When recipients of two halves of a pair of entangled particles, such as key managers Alice and Bob, use a same measurement basis, the respective corresponding measurement results will be known by the other party.

In order to "verify" integrity of a quantum entangled particle distribution, key managers Alice and Bob may further exchange a portion of their determined measurement results. For example, if key managers Alice and Bob received entangled particles and measured them in a same basis state such that 1,000 same basis state measurements resulted, each indicating a "0" or "1", as an example, these "0"'s and "1"'s should be identical for both key manager Alice and key manager Bob. To verify the integrity of the distribution, either key manager Alice or key manager Bob (or both) may share a sub-set of the 1,000 results with the other. For example, key manager Alice may share 10 results of determined "0"'s and "1"'s of the 1,000 with key manager Bob, and key manager Bob may verify that key manager Alice's results of what her measurements indicate Bob receiving actually match Bob's results. If there is a match, integrity can be verified. Also, the lack of tampering is guaranteed due to the superposition state distribution of the entangled particles. In some embodiments, if there is a near, but not perfect match, entropy compression techniques may be applied to account for the slight non-match.

These measurement results measured in the same basis may be used to generate a quantum key distribution (QKD) key inventory based, at least in part, on the quantum entanglement distribution shared between QKD nodes.

In some embodiments, key managers may enable recipients, such as applications, of a QKD key to establish shared secret bits between applications. This shared secret may then be used as an encryption key in order to encrypt and decrypt other communications shared between the applications. In some embodiments, the shared QKD key may be distributed via channels such as traditional network links. Some systems of quantum key distribution require trust in intermediaries to transmit the quantum key to recipients without leaking the key.

Quantum entangled particle distribution often involves losses, wherein only a fraction of quantum entangled particles distributed from an entangled pair source are successfully received and measured by intended key managers. Thus, in some embodiments, quantum entanglement may be distributed at a rate that far exceeds an amount of quantum entanglement that needs to be received by the key managers in order to communicate information (such as a quantum key) encoded in the entangled quantum particles. Also, a rate at which entangled particles are lost or fail to be measured by recipients may fluctuate and/or be hard to predict.

For example, physical properties of entangled quantum particles such as position, momentum, spin, and/or polarization may be perfectly correlated across large distances when entangled. In some cases, such properties may have a correlation such as same or opposite, meaning that if a first quantum particle of an entangled pair of quantum particles has a first spin direction, it's entangled quantum particle partner may have a spin direction that is the same or opposite of the direction of the spin of the first quantum particle of the entangled pair of quantum particles. In some embodiments, a basis of measurement may also be communicated via classical communication channels, such as a basis of measurement indicating an axis on which spin is pointing.

FIG. 1 illustrates an example of a management service used for relaying a quantum key distribution (QKD) key between a source QKD node and a destination QKD node, wherein the management service receives a request for distribution of a QKD key, selects a path for relay of the key, and selects one or more relay techniques to be used to relay the QKD along the path, according to some embodiments.

In some embodiments, management service 102 comprises a repository 104, wherein repository 104 includes information such as net QKD key bit inventory, consumption rate and demand for a given QKD node, as well as QKD key bit inventory, consumption rate, and demand shared between a pair of given QKD nodes, data 106. For example, QKD node pair S and A have a net QKD key bit consumption rate $C_{SA}$ and demand $D_{SA}$. Furthermore, node S and node A each have a separate copy of a local shared QKD key bit inventory $I_{SA}$. Furthermore, the data net QKD key bit consumption rate, raw QKD key bit generation rate data and QKD key bit demand may be related in the following way: net QKD key consumption rate (e.g., $C_{SA}$) may be defined as a raw QKD key bit generation rate (e.g., $R_{SA}$) for a given QKD node pair (e.g., node S and node A) minus a QKD key bit demand (e.g., $D_{SA}$) (e.g., caused by key forwarding). The relationship may be written $C_{SA}=R_{SA}-D_{SA}$. Therefore, if two of these data are known, the third data may also be known based on the other two data. Furthermore, if the net QKD key bit consumption rate is positive, more QKD key bits are being consumed than generated. If the net QKD key bit consumption rate is negative, more QKD key bits are being generated than consumed.

In some embodiments, management service 102 comprises path selection 108, wherein path selection 108 determines a path comprising of links between QKD nodes from a source node, one or more intermediate nodes and a destination node.

In some embodiments, management service 102 comprises key relay technique selection 110, wherein a technique from a group of one or more relay techniques may be dynamically selected to relay a QKD key between a given pair of nodes. A technique may dynamically be selected by switching from a first technique that uses more bits to a second technique that uses less bits and vice versa. In some embodiments, the group of relay techniques may include a first key relay technique that utilizes a one-time pad (OTP) method and a second key relay technique that utilize a key wrapping method.

In some embodiments, management service 102 comprises path/key relay optimization 112, wherein path/key relay optimization may iteratively determine which path and which relay technique is suitable for key relay between a source node and a destination node of a plurality of QKD nodes. The determination of paths and selection of relay techniques may depend on one or more factors including QKD key bit inventory, net QKD key bit use rate, and demand. Path/key relay optimization 112 may optimize an initial path and change the path based on data (e.g., 106) received by management service 102. The path may be updated before and/or after each relay between QKD nodes, or according to a predefined frequency fp. In some cases, the same initial path may be used, and the relay technique or techniques may be changed.

In some embodiments, management service 102 may be configured to receive requests such as request 114 requesting a distribution of a QKD key between a source node and a destination node. The request may come because of one application requesting secure communication with an additional application.

Figure 2A:
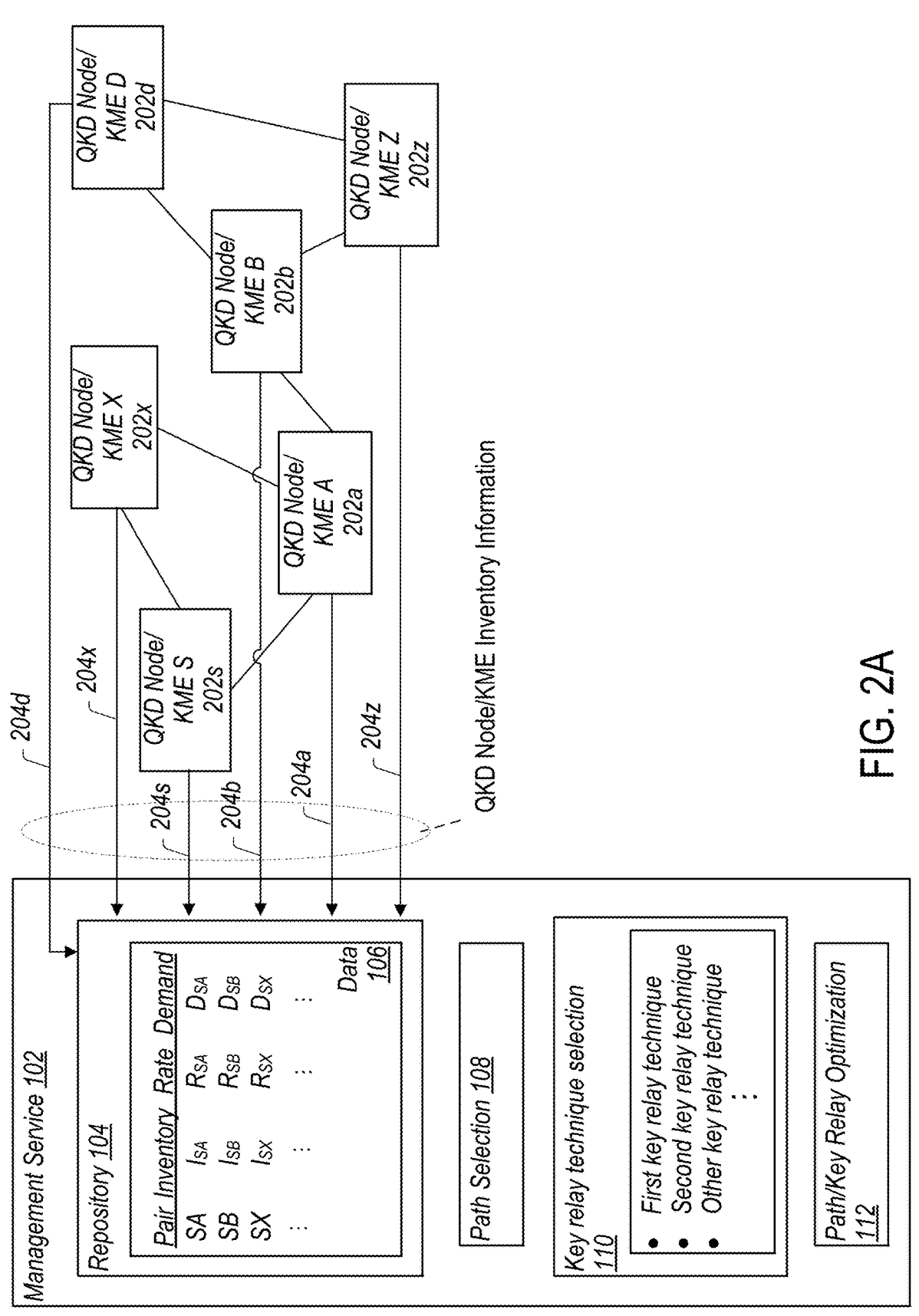
FIG. 2A illustrates an example of a management service used for relaying a QKD key between a source QKD node and a destination QKD node of a plurality of QKD nodes of a QKD network, wherein the management service receives inventory information from respective QKD nodes belonging to the plurality of QKD nodes, according to some embodiments.

FIG. 2A illustrates an example of a management service used for relaying a QKD key between a source QKD node and a destination QKD node of a plurality of QKD nodes of a QKD network, wherein the management service receives inventory information from respective QKD nodes belonging to the plurality of QKD nodes, according to some embodiments.

In some embodiments, a management service 102 may receive QKD node or key management entity (KME) inventory information for a given node of a plurality of QKD nodes of a QKD network. For example, QKD node/KME S 202s (or 202a, 202b, 202d, 202x, or 202z) may send information via communication 204s (or 204a, 204b, 204d, 204x, 204z respectively) regarding QKD key bit inventory level, net QKD key bit consumption rate, and demand for the given QKD node/KME. Management service 102 may receive the inventory information and store it in Repository 104 as data 106. Other data relating to the productivity and/or state of a given QKD node/KME may also be sent to management service 102 and stored in repository 104.

In some embodiments, a plurality of QKD nodes/KMEs may be interconnected via network links. A given QKD node/KME may have one or more links to one or more other QKD nodes/KMEs. For example, node S 202s is linked to node X 202x and node A 202a. Node A 202a is linked to node S 202s, node X 202x and node B 202b. Node B 202b is linked to node A 202a, node D 202d and node Z 202z. Node Z 202z is connected to node B 202b and node D 202d. Finally, node D 202d is linked to node B 202b and node Z 202z. In a given QKD network, there may be other nodes (e.g. entanglement pair source node, quantum repeater) and links between QKD nodes. For simplicity, FIG. 2A shows a simplified network. Given pairs of nodes may provide QKD key bit inventory, net QKD key bit consumption rate, demand, and a point-to-point secure key rate $R_{link}$ (e.g., in units of bits/second), wherein $R_{link}$ describes a rate at which a given pair of nodes may provide QKD key bits for consumption or use (e.g., $R_{SA}$ and $R_{SB}$ of data 106). The point-to-point secure key rate $R_{link}$ may fluctuate due to various factors such as temperature, quantum material communication reliability, or other environmental factors. Thus, information regarding inventory for each node may be updated periodically to ensure a current rate is being considered.

In some embodiments, management service 102 may be implemented using centralized architecture or distributed architecture. An example of centralized architecture is given in FIG. 2A, wherein QKD node inventory information is provided to a centralized management service. In other embodiments utilizing a distributed architecture, respective QKD nodes may have a control plane function of a management service besides or within a key management entity.

Figure 2B:
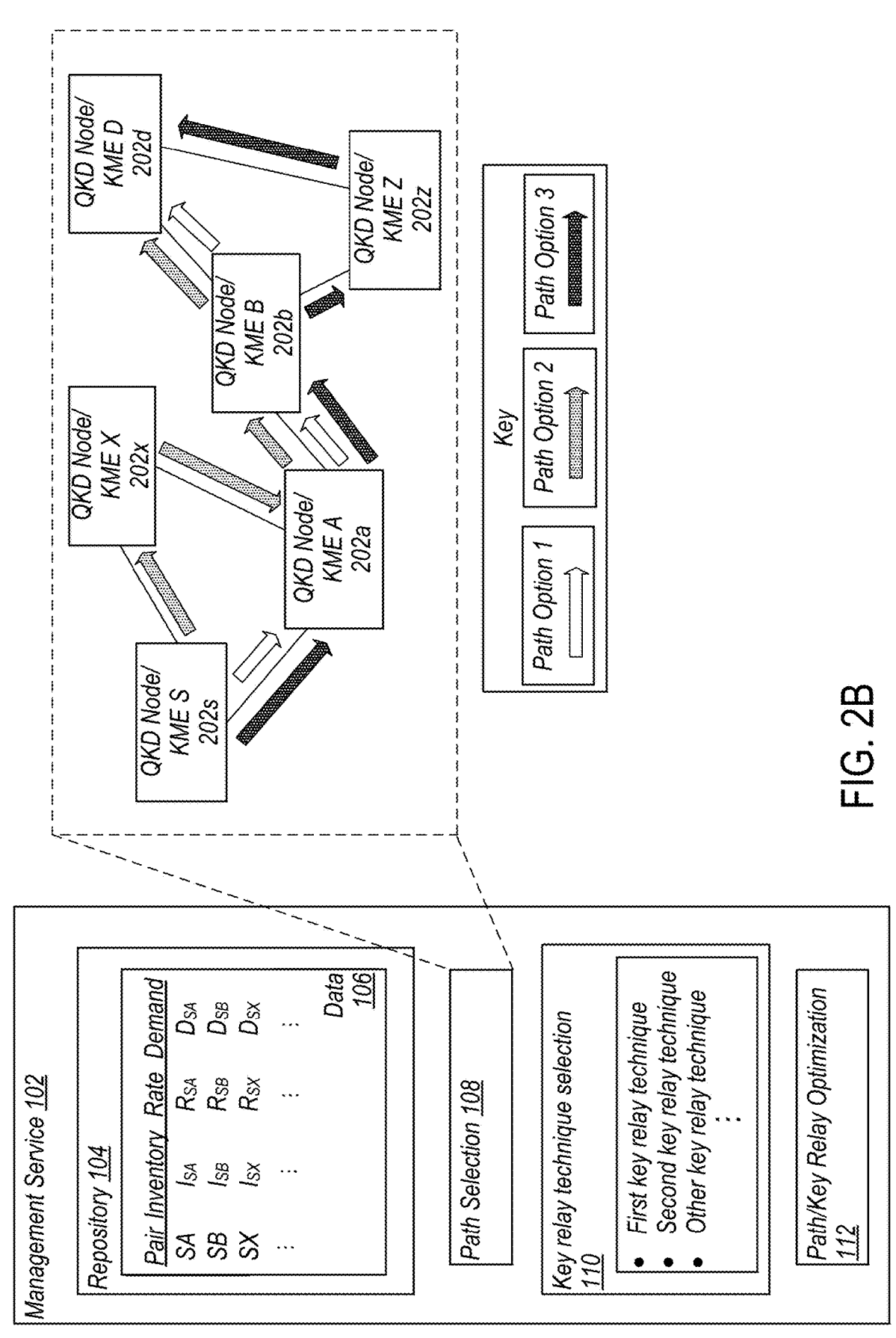
FIG. 2B illustrates an example of a management service used for relaying a QKD key between a source QKD node and a destination QKD node of a plurality of QKD nodes of a QKD network, wherein the management service determines a path from the destination QKD node to the source QKD node, according to some embodiments.

FIG. 2B illustrates an example of a management service used for relaying a QKD key between a source QKD node and a destination QKD node of a plurality of QKD nodes of a QKD network, wherein the management service determines a path from the destination QKD node to the source QKD node, according to some embodiments.

In some embodiments, management service 102 may select a path to relay a QKD key from a source node (e.g., QKD node/KME S 202s) to a destination node (e.g., QKD node/KME D 202d) from among one or more path options. For example management service 102 may identify 3 paths: path option 1 includes relaying a key from node S 202s to node A 202a, to node B 202b and then to node 202d; path option 2 includes relaying a key from node S 202s to node X 202x, to node A 202a, to node B 202b, to node D 202d; and path option 3 includes relaying a key from node S 202s to node A 202a, to node B 202b, to node Z 202z, and to node D 202d. For each path option, the source node and destination node remain the same (e.g., the source node is node S 202s and the destination node is node D 202d). For example, management service 102 may select path option 1 to relay a key from node S 202s to node D 202d. Furthermore, when a key is being relayed along a selected path, management service 102 may update or change the path based on path/key relay optimization 112. For example, to relay a key from node S 202s to node 202d, a path may start as path option 1. Nevertheless, management service 102 may receive updated information on QKD key bit inventory, net QKD key bit use rate, and/or demand while relaying the key and may update the path route to relay the key from node B 202b to node Z 202z and to node D 202d instead of directly from node B 202b to node D 202d. The updated information, for example, may include that QKD inventory between node B 202b and node D 202d is lower than a predetermined threshold indicating a change of path, and that QKD inventory between node B 202b and node Z 202z is larger than an inventory between node B 202b and node D 202d.

Figure 2C:
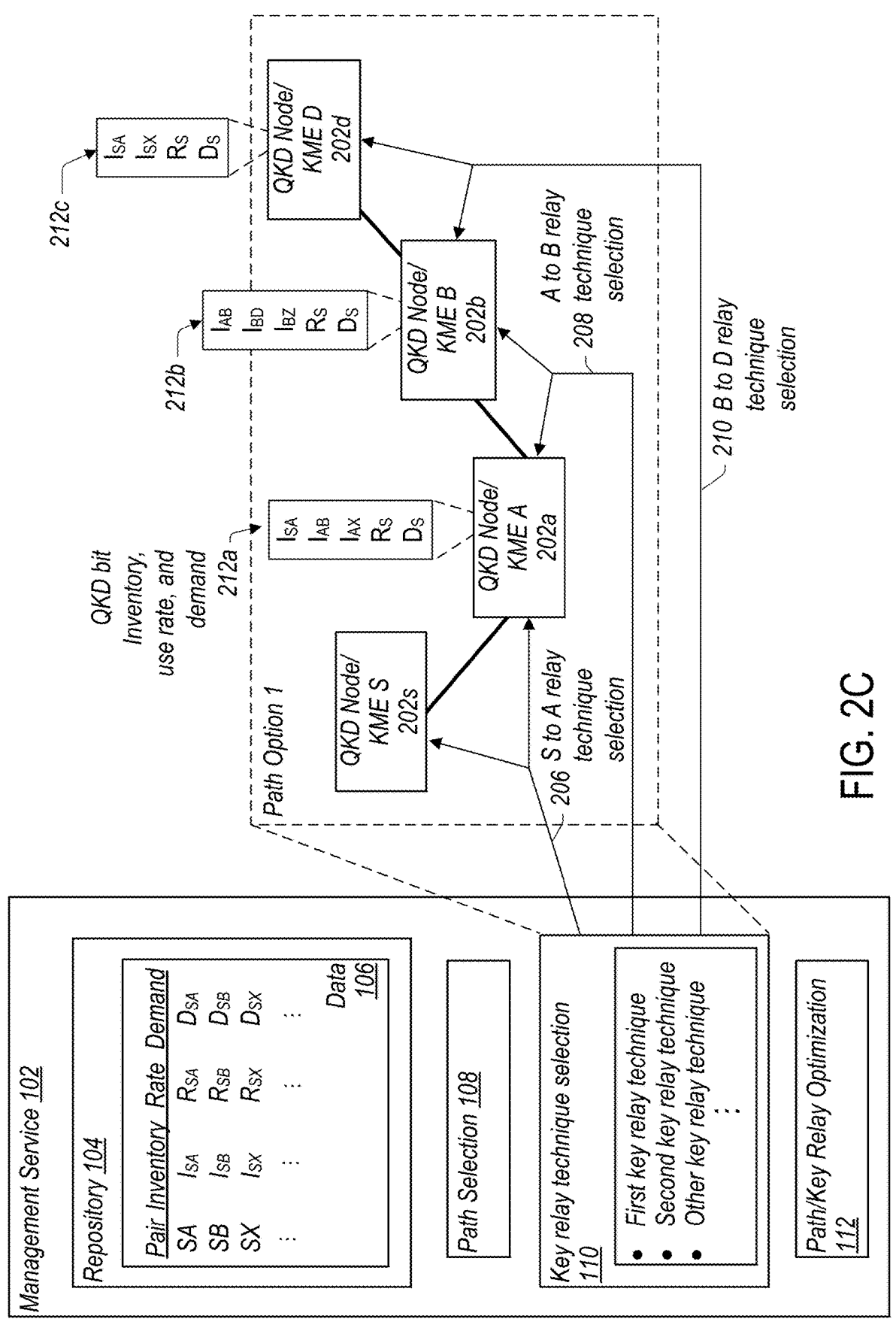
FIG. 2C illustrates an example of a management service used for relaying a QKD key between a source QKD node and a destination QKD node of a plurality of QKD nodes of a QKD network, wherein the management service selects a relay technique to be used to relay a QKD key between QKD nodes/key management entities (KMEs) on a link-by-link basis, according to some embodiments.

FIG. 2C illustrates an example of a management service used for relaying a QKD key between a source QKD node and a destination QKD node of a plurality of QKD nodes of a QKD network, wherein the management service selects a relay technique to be used to relay a QKD key between QKD nodes/key management entities (KMEs) on a link-by-link basis, according to some embodiments.

In some embodiments, management service 102 may select path option 1 by way of path selection 108 and path/key relay optimization 112. Key relay technique selection 110 may include a plurality of key relay techniques to dynamically select from, such as a first key relay technique, second key relay technique, and other key relay techniques, wherein the relay technique may cause a key to be relayed from one node to another node via a link between the nodes (e.g., relay a key between node S 202s and node A 202a). The first technique may use more QKD key bits to execute while the second relay technique may use less bits to execute. Key relay technique selection 110 may dynamically select a key relay technique based on data such as QKD key bit inventory level, net QKD key bit consumption rate, and demand (e.g., data 106) on a link-by-link basis. Given a selected key relay technique for a given pair of nodes, the relay technique may be communicated to respective nodes (e.g., communication 206, 208, and 210). For example, a technique may be determined to relay a key between node A 202a and node B 202b and the technique may be communicated to node A 202a and node B 202b via communication 208. In other embodiments, the relay technique may be communicated to a sending node (e.g., node A 202a), wherein a receiving node (e.g., node B 202b) may detect the selected relay technique by the protocol fields. When local QKD key bit inventory level for node A 202a and node B 202b, (e.g., $I_{AB}$ of data 106) is greater than or equal to a pre-determined threshold $L_1$, the key forwarding technique may operate in the first key relay technique mode (e.g., a key relay technique such as one-time pad (OTP)). By further example, a technique may be determined by a net QKD key bit consumption rate ($C_A$, and $C_B$), wherein if the net QKD key bit consumption rate is less than or equal to a predetermined threshold $C_1$, the key forwarding technique may operate in the first key relay technique mode (e.g., OTP). The key relay technique may also be determined by a combination of QKD key bit inventory level and net QKD key bit consumption rate with other thresholds.

In some embodiments, a technique may be determined to relay a key between node A 202a and node B 202b and the technique may be communicated to node A 202a and node B 202b via communication 208. when local QKD key bit inventory level for node A 202a and node B 202b, (e.g., $I_{AB}$ of data 106) is less than or equal to a pre-determined threshold $L_2$, the key forwarding technique may operate in the second key relay technique mode (e.g., a key relay technique such as key wrapping). By further example, a technique may be determined by a net QKD key bit consumption rate ($C_A$, and $C_B$), wherein if the net QKD key bit consumption rate is greater than or equal to a predetermined threshold $C_2$, the key forwarding technique may operate in the second key relay technique mode (e.g., key wrapping). The key relay technique may also be determined by a combination of QKD key bit inventory level and net QKD key bit consumption rate with other thresholds.

In some embodiments, a management service may select a key relay technique, wherein the key relay technique may be selected between a first relay technique using more bits to a second relay technique using less bits and vice versa. The management service may select the other technique if QKD key bit inventory levels and net QKD key bit consumption rates fluctuate and go above or below a given threshold such as described above. For example, node A 202a comprises QKD information 212a such as QKD key bit inventory, net QKD key bit consumption rates, and demands. Furthermore, node B 202b comprises QKD information 212b such as QKD key bit inventory, net QKD key bit consumption rates, and demands. Information 212a and 212b are shared with management service 102 and stored in repository 104 in data 106. At a given time $t_1$, information stored in repository 104 is updated to represent information relating to the time $t_1$. Such information at time $t_1$ may be used to determine that QKD key bit inventory $I_{AB}$ is greater than or equal to a predetermined threshold $L_1$ (e.g., $I_{AB} \geq L_1$). Consequently, key relay technique selection 110 selects a first technique that uses more bits (e.g., one-time pad (OTP) and a separate data integrity protection method). At a different later time $t_2$, information stored in repository 104 is updated to represent information relating to the time $t_2$. Such information at time $t_2$ may be used to determine that QKD key bit inventory $I_{AB}$ is less than or equal to another predetermined threshold $L_2$ (e.g., $I_{AB} \leq L_2$). Consequently, key relay technique selection 110 dynamically selects a second technique that uses less bits to relay a key from node A 202a to node B 202b, wherein the first technique selected for time $t_1$ is switched to the second technique for time $t_2$. Furthermore, data stored in repository 104 may be updated as time passes, and selection of a key relay technique may be dynamically adjusted based on the updated data.

In some embodiments, a management service may select a key relay technique, wherein the key relay technique may be selected between a first relay technique using more bits to a second relay technique using less bits and vice versa. The management service may select the other technique if QKD key bit inventory levels and net QKD key bit use rates fluctuate and go above or below a given threshold such as described above. For example, node A 202a comprises QKD information 212a such as QKD key bit inventory, net QKD key bit consumption rates, and demands. Furthermore, node B 202b comprises QKD information 212b such as QKD key bit inventory, net QKD key bit consumption rates, and demands. Information 212a and 212b are shared with management service 102 and stored in repository 104 in data 106. At a given time $t_3$, information stored in repository 104 is updated to represent information relating to the time $t_3$. Such information at time $t_3$ may be used to determine that QKD key bit inventory $I_{AB}$ is greater than or equal to a predetermined threshold $L_1$ (e.g., $I_{AB} \geq L_1$) and a net QKD key bit consumption rate $C_A$ is less than or equal to a predetermined threshold $C_1$ (e.g., $C_A \leq C_1$). Consequently, key relay technique selection 110 selects a first technique that uses more bits (e.g., one-time pad (OTP) and a separate data integrity protection method). At a different later time $t_4$, information stored in repository 104 is updated to represent information relating to the time $t_4$. Such information at time $t_4$ may be used to determine that QKD key bit inventory $I_{AB}$ is less than or equal to another predetermined threshold $L_2$ (e.g., $I_{AB} < L_2$) and a net QKD key bit consumption rate $C_A$ is greater than or equal to a predetermined threshold $C_2$ (e.g., $C_A \geq C_2$). Consequently, key relay technique selection 110 dynamically selects a second technique that uses less bits to relay a key from node A 202a to node B 202b, wherein the first technique selected for time $t_3$ is switched to the second technique for time $t_4$. Furthermore, data stored in repository 104 may be updated as time passes, and selection of a key relay technique may be dynamically adjusted based on the updated data.

In some embodiments, threshold bit inventory level $L_1$ may not be the same as $L_2$, and threshold bit use rate $C_1$ may not be the same as $C_2$. Each threshold may be selected and/or tuned to avoid frequent oscillation between key forwarding techniques. These thresholds may be determined experimentally or by simulations.

Figure 2D:
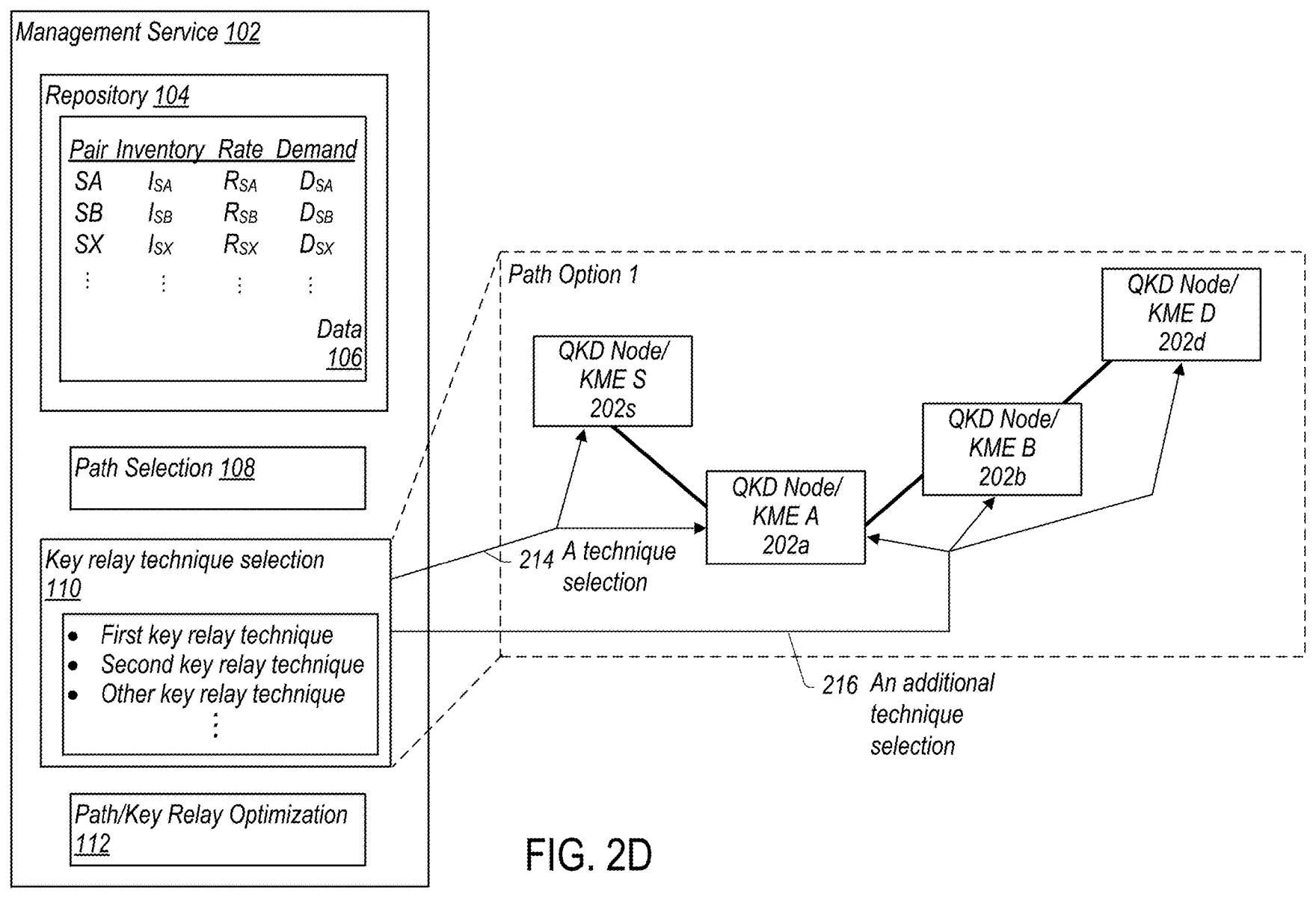

FIG. 2D illustrates an example of a management service used for relaying a QKD key between a source QKD node and a destination QKD node of a plurality of QKD nodes of a QKD network, wherein the management service selects a relay technique and an additional relay technique to be used to relay a QKD key between QKD nodes/KMEs, according to some embodiments.

In some embodiments, management service 102 may select path option 1 by way of path selection 108 and path/key relay optimization 112. Key relay technique selection 110 may include a plurality of key relay techniques to dynamically select from such as a first key relay technique, second key relay technique, and other key relay techniques, wherein the relay technique may cause a key to be relayed from one node to another node via a link between the nodes (e.g., relay a key between node S 202s and node A 202a). The first technique may use more QKD key bits to execute while the second relay technique may use less bits to execute. Key relay technique selection 110 may dynamically select a relay technique and an additional relay technique based on data such as QKD key bit inventory level, net QKD key bit consumption rate, and demand (e.g., data 106) since information about QKD inventory may change with time. A path between a source node and destination node may be divided by the management service 102 into two or more segments, and a key relay technique may be selected for respective segments, wherein respective segments comprise one or more links of the path. For example, a segment may comprise a link between node S 202s and node A 202a, and another segment may comprise a links between node A 202a and node B 202b as well as a link between node B 202b and node D 202d. Key relay technique selection communicates (e.g., 214 and 216) to respective nodes of respective segments which key relay technique to use. While FIG. 2D shows a path of only three links, a given path may include a plurality of links.

Figure 3:
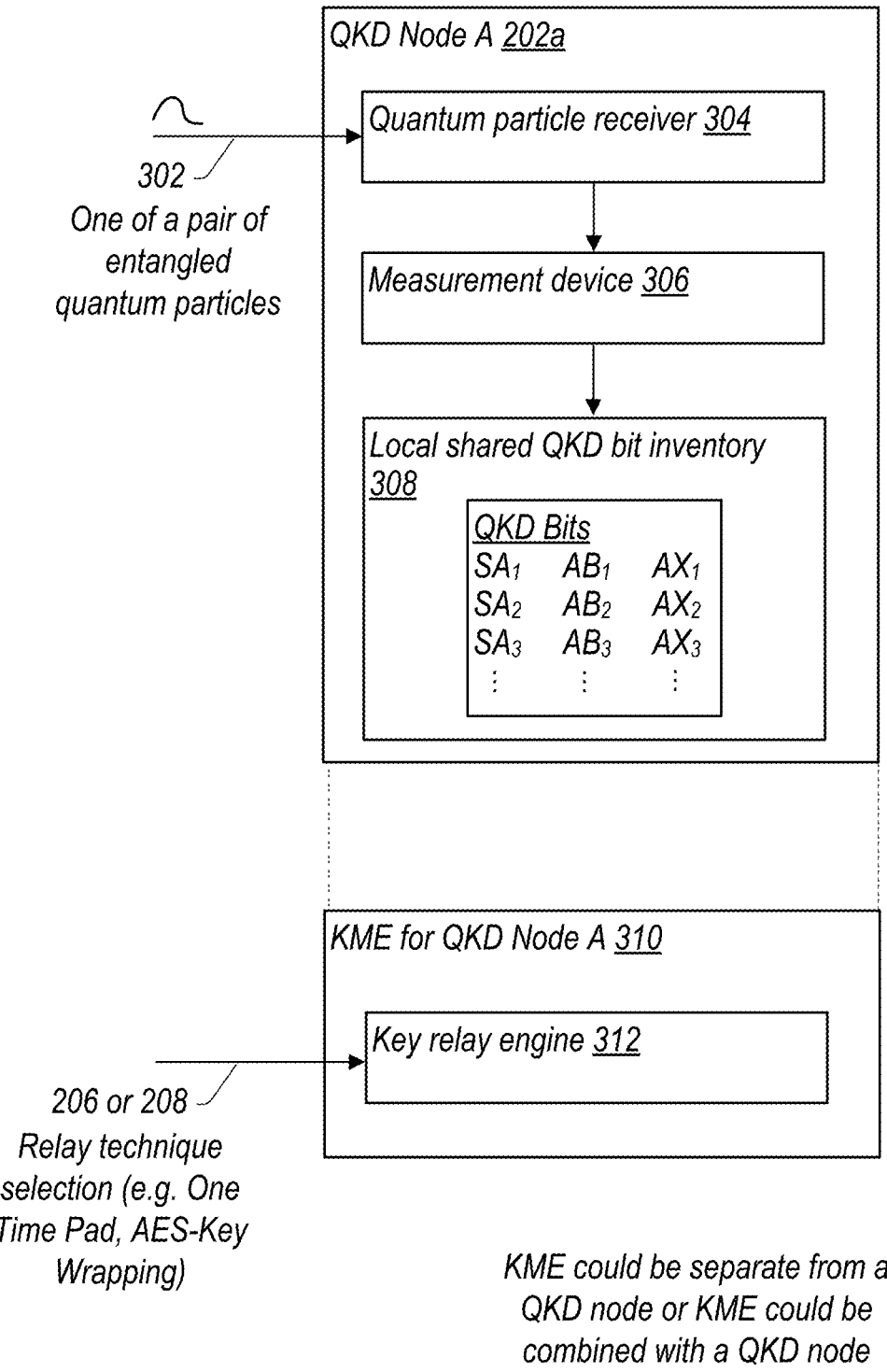
FIG. 3 illustrates an example of a QKD node belonging to a plurality of QKD nodes, wherein the example QKD node comprises a local shared QKD key bit inventory and an associated KME, according to some embodiments.

FIG. 3 illustrates an example of a QKD node belonging to a plurality QKD nodes, wherein the example QKD node comprises a local shared QKD key bit inventory and an associated KME according to some embodiments.

In some embodiments, a QKD node/key management entity (KME) (e.g., node 202s, 202a, 202b, 202d, 202x, or 202z) may receive one of a pair of entangled quantum particles 302 via quantum particle receiver 304. The node may then measure the entangled quantum particle 302 with measurement device 306. The node may receive a plurality of one of a pair of entangled particles and use them for generating QKD key bit inventory. The rate at which a pair of nodes may generate and offer secure QKD key bit inventory may fluctuate due to environmental factors as well as other factors. QKD key bit inventory may be stored in local shared QKD key bit inventory 308, wherein pairs of nodes that each receive one of the same pair of entangled quantum particles may each have a copy of QKD key bit inventory that is stored locally. For example, QKD node A 202a may share a QKD key bit inventory with QKD Node B (e.g., bits $AB_1$, $AB_2$, etc.). QKD node A 202a may also share a QKD key bit inventory with QKD Node X (e.g., bits $AX_1$, $AX_2$, etc.). A key management entity (KME) 310 may be part of the QKD node (e.g., 202a) or separate from the QKD node, wherein KME 310 comprises a key relay engine 312. Key relay engine 312 may receive a relay technique selection (such as 206 or 208), wherein the key relay engine may cause a key to be forwarded from one node/KME to another node/KME along the path. In some embodiments, as a result of the key forwarding operations, the QKD key bit inventory may further contain QKD key bits shared with the other QKD nodes (e.g., node D 202d and node Z 202z) that are not connected to the QKD node via a direct QKD link.

Figure 4A:
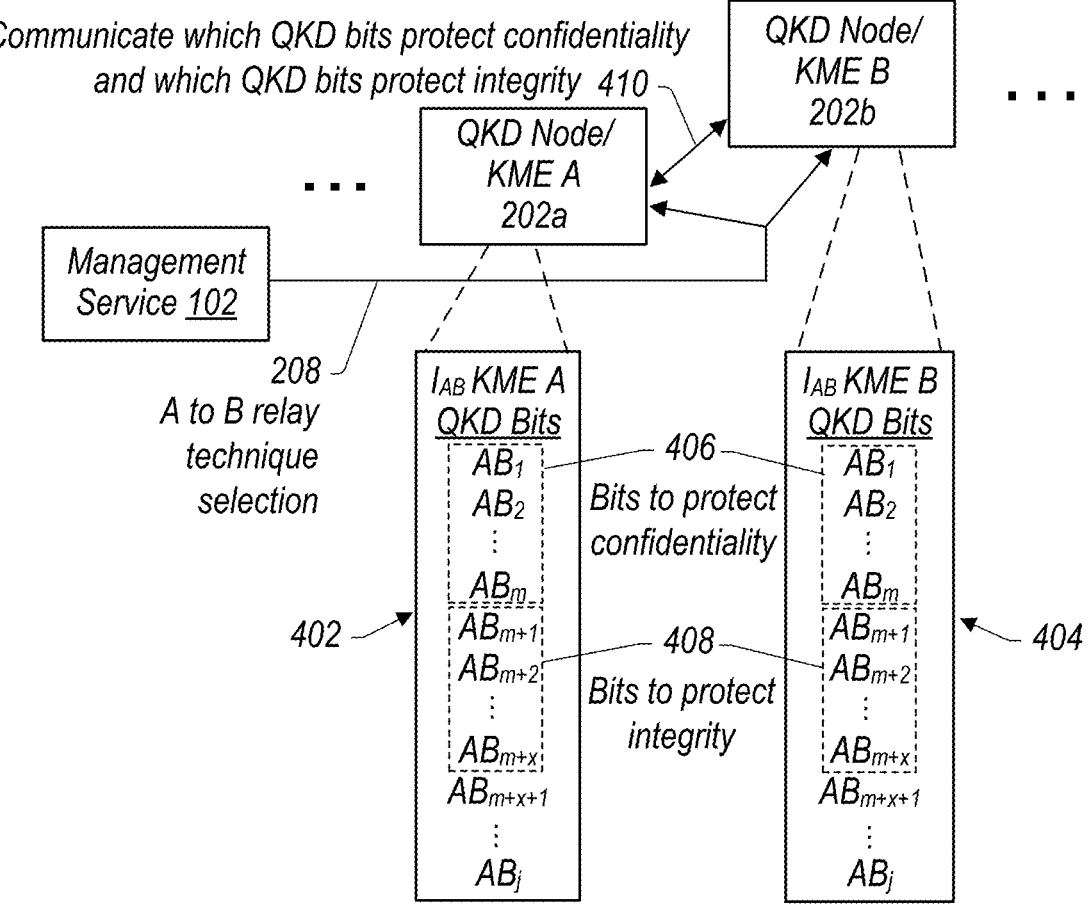
FIG. 4A illustrates an example of a management service communicating a relay technique to a QKD node and an additional QKD node, wherein the QKD node and the additional QKD node have separate copies of shared local QKD key bits, and wherein some QKD key bits may be used to protect confidentiality of a QKD key that is to be relayed and other QKD key bits may be used to protect integrity of the QKD key, according to some embodiments.

FIG. 4A illustrates an example of a management service communicating a relay technique to a QKD node and an additional QKD node, wherein the QKD node and the additional QKD node have separate copies of shared local QKD key bits, and wherein some QKD key bits may be used to protect confidentiality of a QKD key that is to be relayed and other QKD key bits may be used to protect integrity of the QKD key, according to some embodiments.

In some embodiments, management service 102 communicates 208 a selected relay technique between a pair of nodes (e.g., node A 202a and node B 202b). Then node A and node B may communicate which QKD key bits of their shared inventory may be used to protect the confidentiality of a QKD key to be forwarded and which QKD key bits of their shared inventory may be used to protect the integrity of the QKD key (e.g., 410). In some embodiments, management service 102 may communicates the relay technique to use to one node (e.g., node A 202a).

In some embodiments, the local copy of QKD key bits is accessible to KME A, $I_{AB}$ 402, and another local copy of QKD key bits is accessible to KME B, $I_{AB}$ 404. In some key relay techniques of a first key relay technique that uses more QKD key bits may include the following steps. Node A 202a and node B 202b receive information to use a first key relay technique that uses more QKD key bits. The pair of nodes decide on which bits may be used from QKD key bits 402 and 404 to protect confidentiality (e.g., bits 406) and to protect integrity (e.g., bits 408). Node A 202a prepares a key to be relayed using the agreed upon bits to secure communication of the key to node B 202b. Node B 202b receives the secure communication of the key from node A 202a and proceeds to prepare the relayed key to be understood using the agreed upon QKD key bits. Specifically, Node A may use an m number of bits (e.g., bits $AB_1$ through $AB_m$ 406) to protect confidentiality of the key to be relayed. Furthermore, node A uses a number of x bits (e.g., bits $AB_{m+1}$ through $AB_{m+x}$ 408) to protect the integrity of the message. Confidentiality is protected when only the sender and receiver nodes understand what the message (e.g., key relayed) is. Integrity is protected if no bits are intentionally or unintentionally changed during the relay of the message. Node A 202a and node B 202b may have a total number of j bits (e.g., bits $AB_1$ through $AB_j$) shared between them in separate local copies, at a given time point. In some embodiments, the first key relay technique may be the one-time pad (OTP) technique of key forwarding combined with another method for data integrity protection. The number of bits used to protect confidentiality via OTP may be the same number of bits as a key or message to be relayed.

Figure 4B:
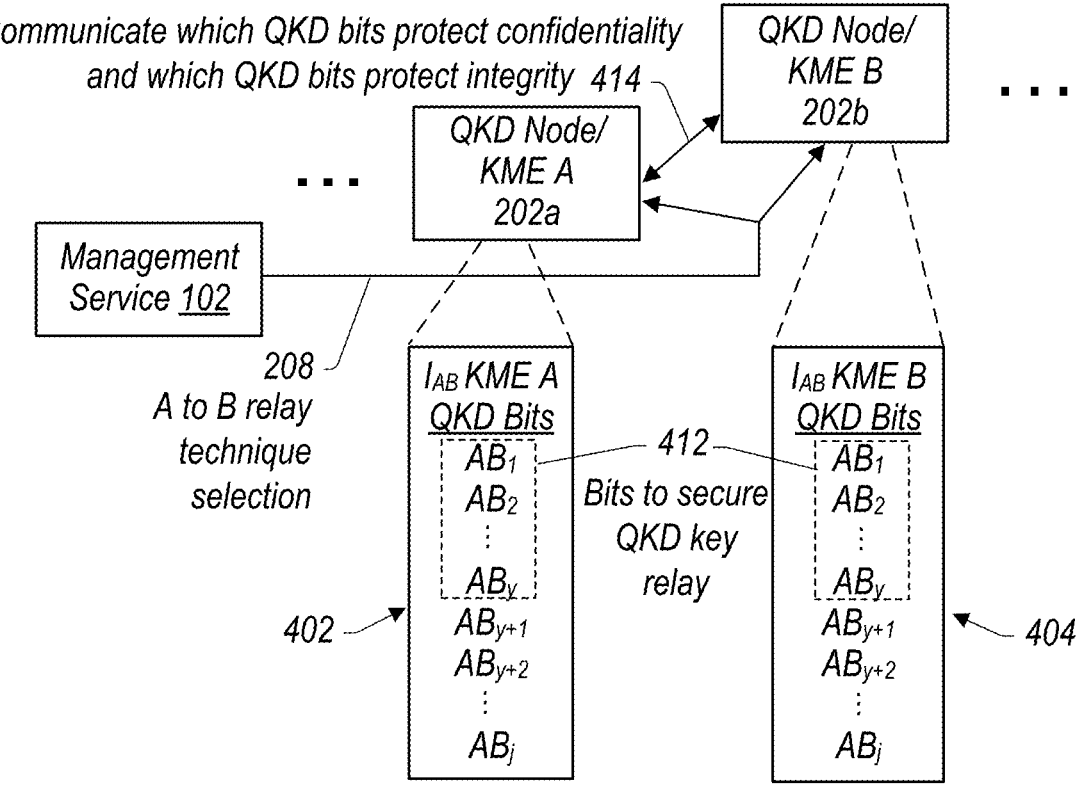
FIG. 4B illustrates an example of a management service communicating a relay technique to a QKD node and an additional QKD node, wherein the QKD node and the additional QKD node have separate copies of shared local QKD key bits, and wherein some QKD key bits may be used to securely relay a QKD key, according to some embodiments.

FIG. 4B illustrates an example of a management service communicating a relay technique to a QKD node and an additional QKD node, wherein the QKD node and the additional QKD node have separate copies of shared local QKD key bits, and wherein some QKD key bits may be used to securely relay a QKD key, according to some embodiments.

In some embodiments, management service 102 communicates 208 a selected relay technique between a pair of nodes (e.g., node A 202a and node B 202b). Then node A and node B may communicate which QKD key bits of their shared inventory may be used to secure communication of the QKD key (e.g., 414). In some embodiments, management service 102 only communicates the relay technique to use to one node (e.g., node A 202a).

In some embodiments, the local copy of QKD key bits is accessible to KME A, $I_{AB}$ 402, and another local copy of QKD key bits is accessible to KME B, $I_{AB}$ 404. In some key relay techniques of a second key relay technique that uses less QKD key bits may include the following steps. Node A 202a and node B 202b receive information to use a second key relay technique that uses less QKD key bits. The pair of nodes decide on which bits may be used from QKD key bits 402 and 404 to securely relay a QKD key. Node A 202a prepares a key to be relayed using the agreed upon bits to secure communication of the key to node B 202b. Node B 202b receives the secure communication of the key from node A 202a and proceeds to prepare the relayed key to be understood using the agreed upon QKD key bits. Specifically, node A may use a y number of bits (e.g., bits $AB_1$ through $AB_y$ 412) to secure communication of the key to be relayed. Node A 202a and node B 202b may have a total number of j bits (e.g., bits $AB_1$ through $AB_j$) shared between them in separate local copies, at a given time point. In some embodiments, the second key relay technique may be a key wrapping technique of key forwarding. Note that generally the number of bits used in the first key relay technique is greater than the number of bits used in the second key relay technique (e.g., (m+x)>>y).

In some embodiments, a QKD key bit inventory for respective nodes may be monitored to allow dynamic selection of a relay technique to be used to relay a QKD key. For example, the generation of QKD key bits and consumption rate of QKD key bits may fluctuate due to various factors such as temperature and demand by users.

Figure 5:
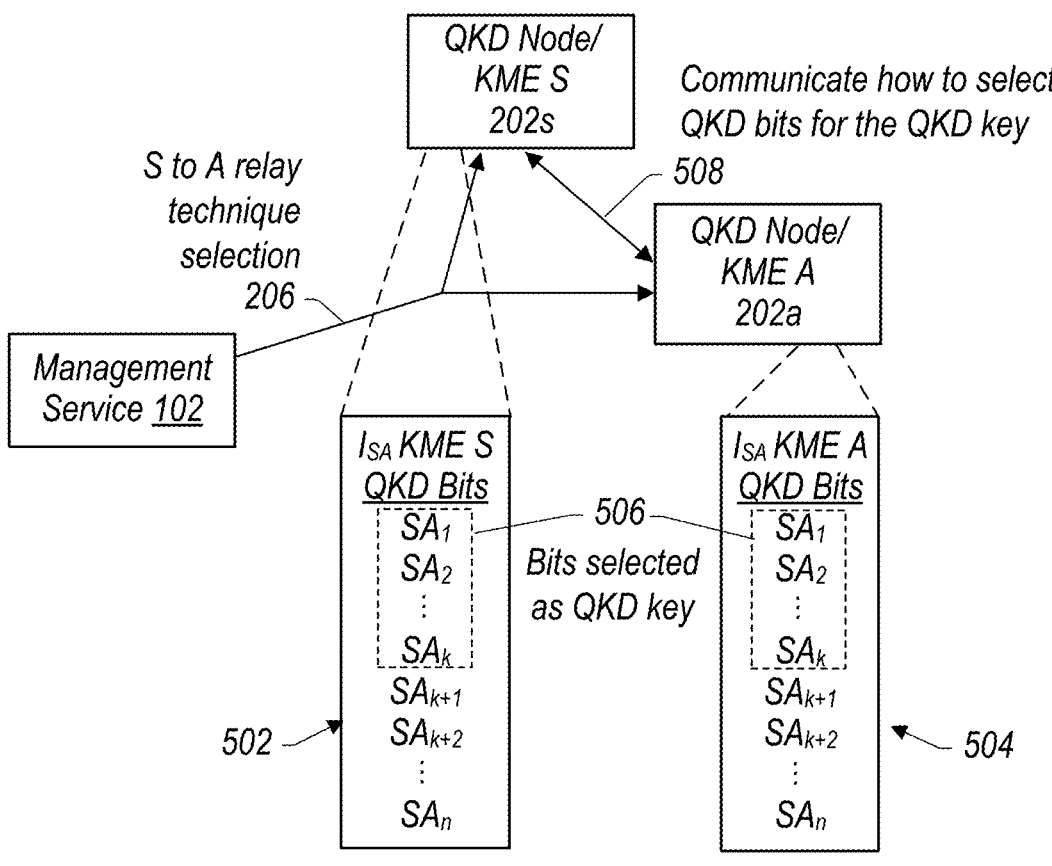
FIG. 5 illustrates an example of a management service communicating a relay technique to a source QKD node and an additional QKD node, wherein QKD nodes communicate which bits of separate copies of shared local QKD key bits may be used as a QKD key, according to some embodiments.

FIG. 5 illustrates an example of a management service communicating a relay technique to a source QKD node and an additional QKD node, wherein QKD nodes communicate which bits of separate copies of shared local QKD key bits may be used as a QKD key, according to some embodiments.

In some embodiments, the management service 102 may communicate 206 to a source node and/or a next node (e.g., node S 202s and/or node A 202a) a path to relay a QKD key from a source node to a destination node. A source node may query a path selection function (e.g., 108) to know what is the next node in the path. In such an embodiment, the source node and the next node may only need to decide on which bits will be a key. For example, node S 202s comprises QKD key bits $I_{SA}$ 502 and node A 202a comprises another copy of QKD key bits $I_{SA}$ 504. Node S 202s and node A 202a decide upon which QKD key bits (e.g., bits $SA_1$ through SAK 506) may be used to be a QKD key. Consequently, node S 202s and node A 202a know a secrete key to be relayed to a destination node (e.g., node D 202d). Communication on how to select QKD key bits for the QKD key 508 may be on a classical channel and include information such as indexes of bits, wherein the bits may be used to establish the QKD key.

Figure 6:
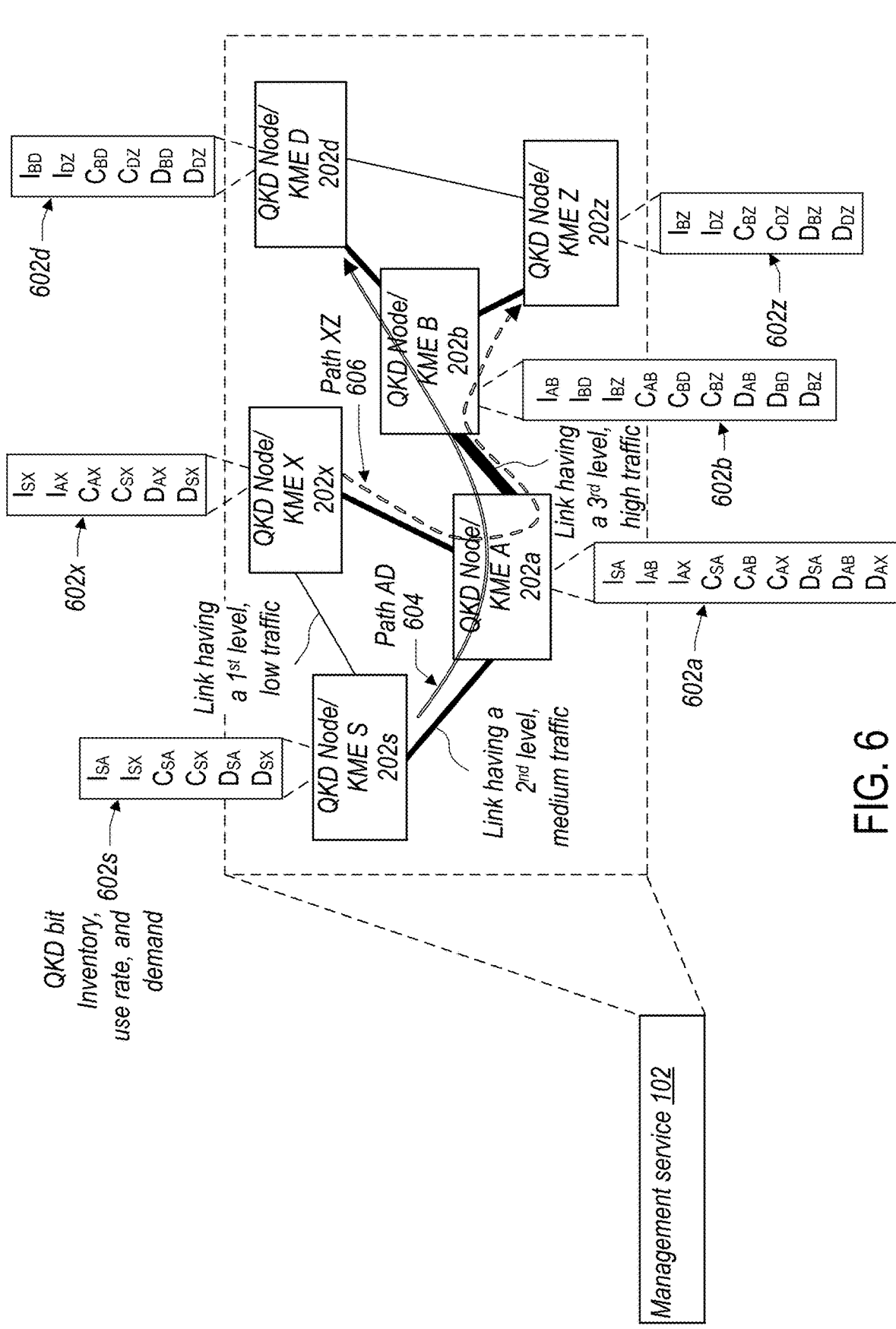
FIG. 6 illustrates an example of a management service determining more than one at least partially-overlapping paths for more than one set of source-destination pairs of a QKD network, wherein the paths may be selected based on QKD key bit inventory, net QKD key bit use rate, demand, etc., according to some embodiments.

FIG. 6 illustrates an example of a management service determining more than one at least partially-overlapping paths for more than one set of source-destination pairs of a QKD network, wherein the paths may be selected based on QKD key bit inventory, net QKD key bit consumption rates, demands, etc., according to some embodiments.

In some embodiments such as shown in FIG. 6, different QKD keys may be forwarded between a plurality of source and destination pairs of a QKD network. For example, a key may be relayed from node S 202s to node A 202a to node B 202b to node D 202d (e.g., path AD 604). Furthermore, another key may be relayed from node X 202x to node A 202a to node B 202b and to node Z 202z (e.g., path XZ 606). Consequently, intermediate nodes A 202a and B 202b may require a higher net QKD key bit consumption rate to relay respective QKD keys between more than one node pair (e.g., node pair S 202s and D 202d, and node pair X 202x and Z 202z). As illustrated by a thickness of a network link in FIG. 6, a link may have a first level, low traffic or low bit consumption rate between nodes (e.g., link between node S 202s and node X 202x); a link may have a second level, medium traffic or medium bit consumption rate between nodes (e.g., link between node S 202s and node A 202a); or a link may have a third level, high traffic bit use rate between nodes (e.g., link between node A 202a and node B 202b). Respective nodes comprise information about respective QKD key bit inventory, net QKD key bit consumption rates, and demands. For example, 602s illustrates that node S 202s comprises information about a QKD key bit inventory with node A 202a labeled $I_{SA}$ and a QKD key bit inventory with node X 202x labeled $I_{SX}$, a net QKD key bit consumption rate $C_{SX}$, a net QKD key bit consumption rate $C_{SA}$, a demand $D_{SX}$ and a demand $D_{SA}$. QKD key bitQKD key bit Furthermore, respective nodes comprise respective information about QKD inventory (e.g., nodes 202a, 202b, 202d, 202x, and 202z comprise information 602a, 602b, 602d, 602x, and 602z respectively). Furthermore, a given node may have QKD key bit inventory with nodes that are indirectly linked. For example, as described herein, node S 202s generates a shared QKD key bit inventory with node D 202d by relaying QKD key bits from node S 202s to node D 202d. Respective pairs of nodes of a QKD network may have a QKD key bit inventory regardless of if there is a direct link or indirect link between them.

In some embodiments, a path selected for key relay between a source and destination node pair may update due to an addition of another path selected for another key relay between another source and destination node pair. For example, addition of a path selected for key relay between a new source and destination nodes pair may change information about QKD inventory such as QKD key bit inventory, net QKD key bit consumption rate and demand (e.g., information 602s, 602a, 602b, 602d, 602x, and 602z). Consequently, a path may be updated and/or a technique selected for relay of a respective QKD key may change according to criteria such as described herein. The path and/or technique selected for relay of a respective QKD key may change to conserve the number of bits used at a given node or in view of a QKD network as a whole. The demand for use of QKD key bits may be less than a supply of QKD key bits and thus a relay technique using less QKD key bits may be warranted.

Figure 7:
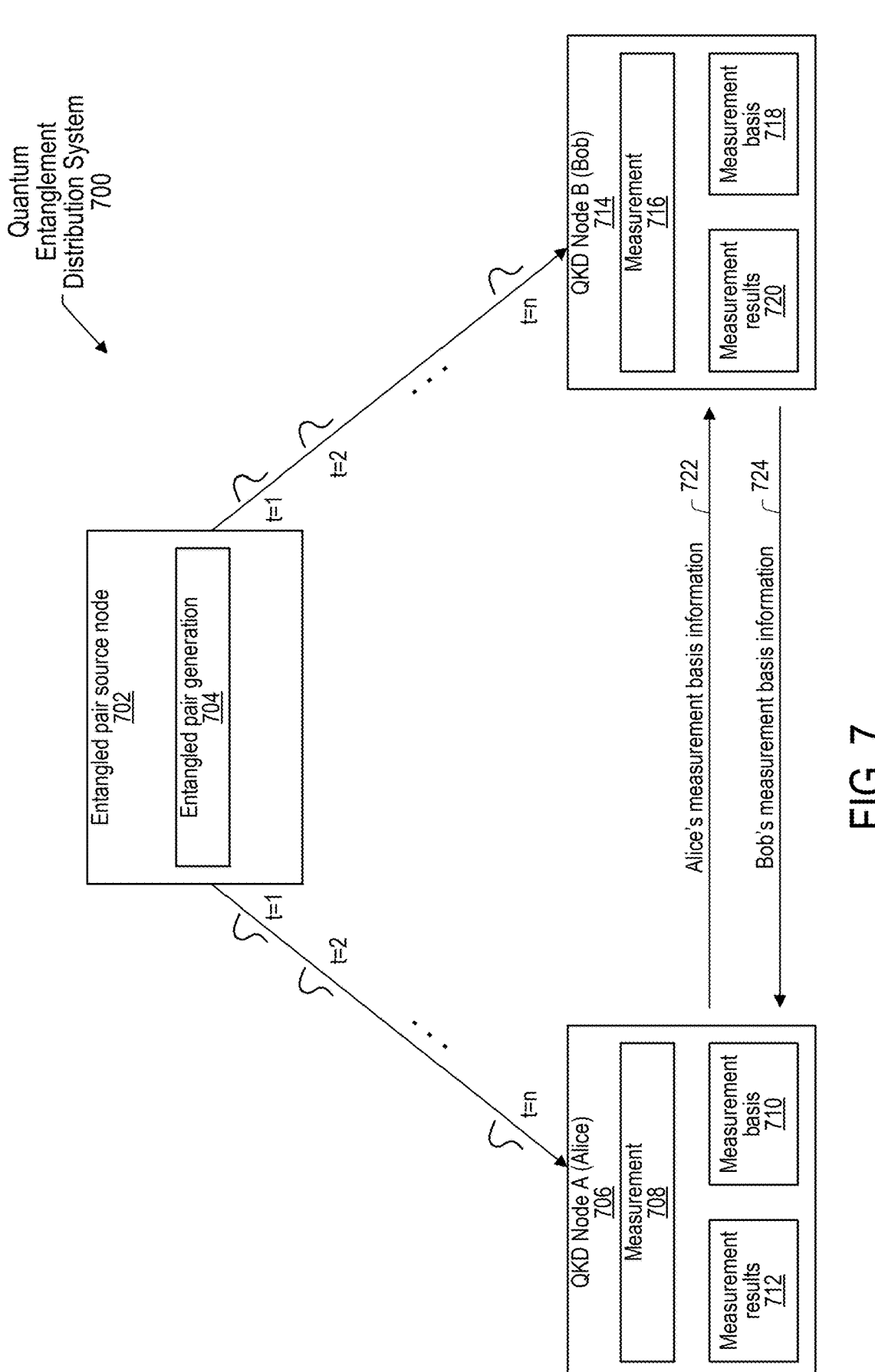
FIG. 7 illustrates recipients (e.g., QKD node A and QKD node B) of a distributed quantum entanglement exchanging counter-party measurement basis information to identify entangled particles measured in the same basis by both recipients, according to some embodiments.

FIG. 7 illustrates recipients (e.g., QKD node A and QKD node B) of a distributed quantum entanglement exchanging counter-party measurement basis information to identify entangled particles measured in the same basis by both recipients, according to some embodiments.

In some embodiments, a quantum entanglement distribution system, such as quantum entanglement distribution 700, may be used to distribute quantum entangled particles to recipients, such as QKD nodes of a quantum key distribution network. In some embodiments, quantum entanglement distribution 700 includes an entangled pair source node 702 that includes an entangled pair generation element. The entangled pair generation element may emit pairs of entangled particles, such as entangled photons to recipients, such as QKD node A (Alice) 706 and QKD node B (Bob) 714.

Communications 722 and 724 may be used to share measurement basis information 710 and 718 between QKD node A (Alice) 706 and QKD node B (Bob) 714. In some embodiments, various networking links may, such as conventional private or public networks, may be used to transmit the measurement basis information. In order to determine a bit of a secret, the measurement results and the measurement basis are needed. Thus, transmission of the measurement basis information via such traditional networks does not degrade the secrecy of the distributed quantum entanglement. In some embodiments, it may not be necessary for both QKD node A (Alice) 706 and QKD node B (Bob) 714 to share their measurement basis information with the other recipient. For example, QKD node A (Alice) 706 could receive QKD node B (Bob) 714 measurement basis information 718 and determine which entangled particles both Alice and Bob measured in the same measurement basis. Alice could then provide Bob information indicating which particles were measured in the same measurement basis without necessarily providing Bob measurement basis information 710.

FIG. 8 illustrates an example of measurement information of a distributed quantum entanglement maintained by key manager A, according to some embodiments.

In some embodiments, QKD node A and QKD node B respectively receive one particle of a pair of entangled particles sent by entangled pair source node 702. As an example, table 806 comprises the measurement basis QKD node A and QKD node B selected to measure the received respective particles of a pair of entangled particles. Measurement basis A 802 or measurement basis B 804 may be chosen randomly by each of QKD node A (e.g., 706) Alice and QKD node B (e.g., 714) Bob. Wherein a measurement basis of QKD node A (e.g., 710) and a measurement basis of QKD node B (e.g., 718) are chosen to be the same for a pair of entangled particles, QKD node A and QKD node B may be certain of the result the other QKD node made. In some embodiments, QKD node A and QKD node B may exchange measurement basis information (e.g., 710 or 718) on a classical network as shown by 722 and 724.

FIG. 9 is a flowchart illustrating an example of a method for relaying a key between nodes selected from a plurality of nodes in a quantum key distribution (QKD) network, according to some embodiments.

In some embodiments, a method to relay a QKD key comprise the following steps. Measuring one or more properties of a received entangled quantum particle 902. Generating shared QKD key bits based on the measured one or more properties of respective entangled particles and store the bits in a local shared QKD key bit inventory 904. Receiving a request for distribution of a QKD key 906. Determining a path, comprising one or more links between respective pairs of QKD nodes of a plurality of QKD nodes that share a local shared QKD key bit inventory, between a QKD node and an additional QKD node of the plurality of QKD nodes 908. Selecting one or more techniques to be used to relay the QKD key, wherein the one or more techniques are selected from a set of techniques comprising at least a first technique using more QKD key bits and a second technique using less QKD key bits 910. Cause the one or more selected techniques to be performed to relay the key between respective pairs of nodes along the path 912.

FIG. 10 is a flowchart illustrating an example of determining a path and selecting a relay technique for relaying a QKD key from a source node to a destination node of a plurality of nodes in a QKD network, wherein the determining the path and selecting the relay technique are based on QKD key bit inventory level and QKD key bit demand according to some embodiments.

In some embodiments, a method to determine a path and select a relay technique comprise the following steps. Determine QKD key bit demands and QKD key bit inventory levels of a given node of a plurality of nodes 1002. Determine a path based on the QKD key bit demand and/or QKD key bit inventory level of respective given nodes of the plurality of nodes 1004. Select a technique based on QKD key bit inventory level and one or more predetermined thresholds 1006. Select an additional technique based on QKD key bit inventory level and one or more predetermined thresholds 1008.

Figure 11:
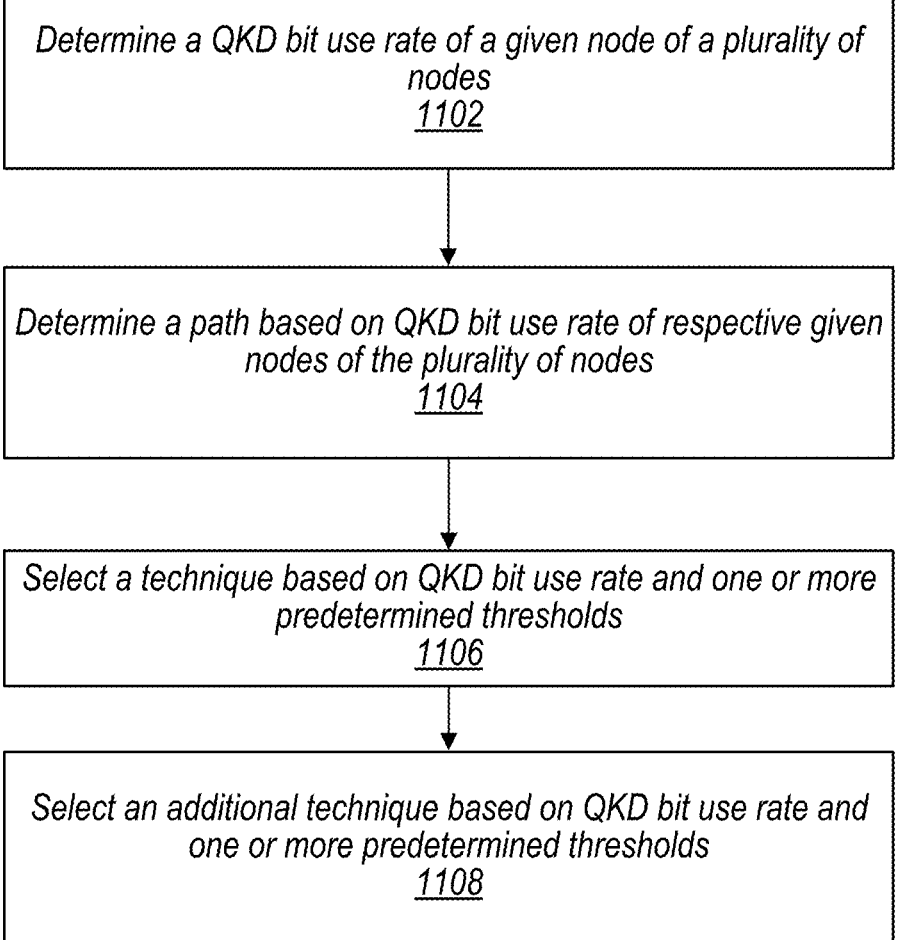
FIG. 11 is a flowchart illustrating an example of determining a path and selecting a relay technique for relaying a QKD key from a source node to a destination node, of a plurality of nodes in a QKD network, wherein determining the path and selecting the relay technique are based on net QKD key bit use rate, according to some embodiments.

FIG. 11 is a flowchart illustrating an example of determining a path and selecting a relay technique for relaying a QKD key from a source node to a destination node of a plurality of nodes in a QKD network, wherein the determining a path and selecting a relay technique are based on net QKD key bit consumption rate according to some embodiments.

In some embodiments, a method to determine a path and select a relay technique comprise the following steps. Determining a net QKD key bit use rate of a given node of a plurality of nodes 1102. Determining a path based on net QKD key bit consumption rate of respective given nodes of the plurality of nodes 1104. Selecting a technique based on net QKD key bit consumption rate and one or more predetermined thresholds 1106. Selecting an additional technique based on net QKD key bit use rate and one or more predetermined thresholds 1108.

Figure 12:
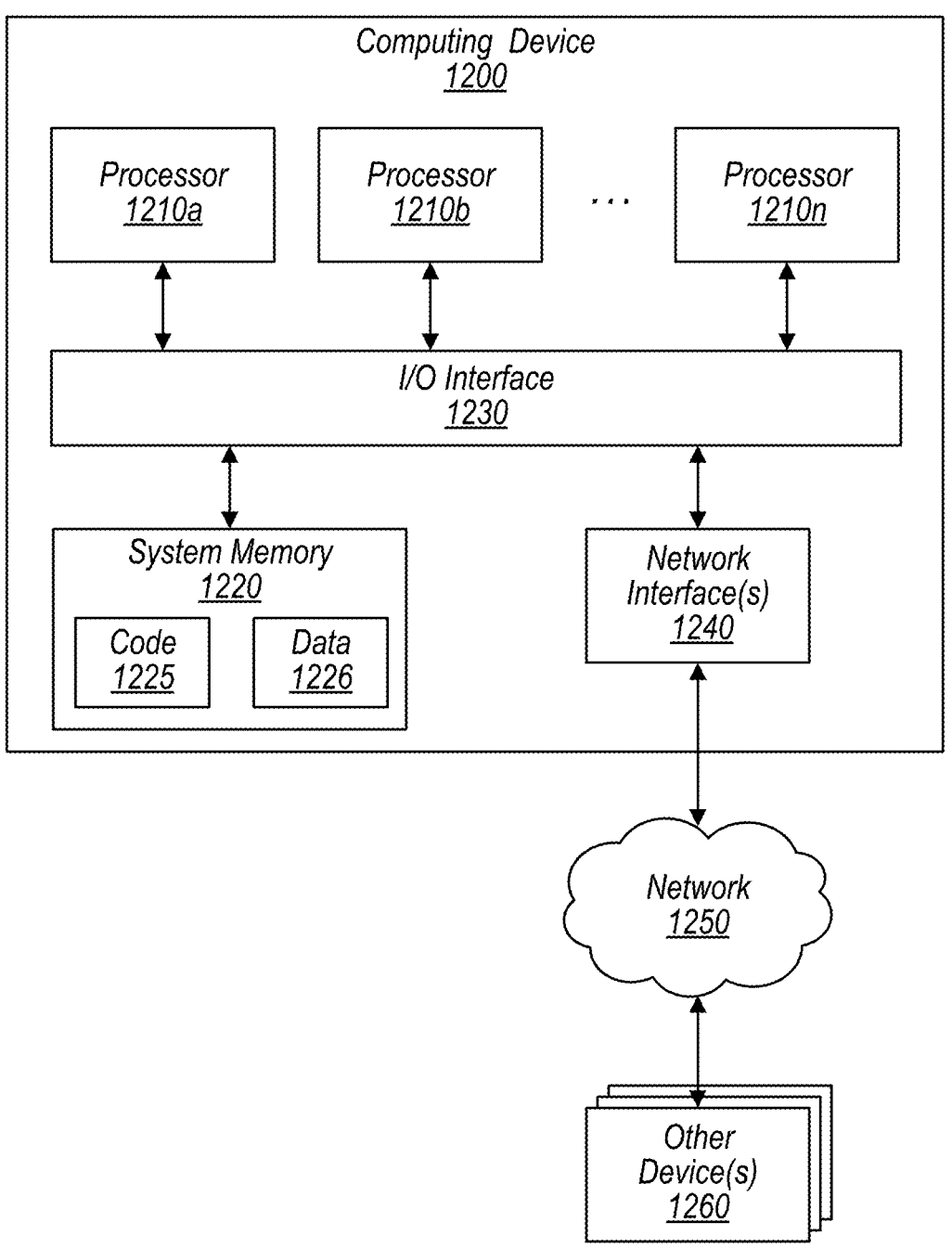
FIG. 12 is a block diagram illustrating an example computing device that may be used in at least some embodiments.

FIG. 12 illustrates such a general-purpose computing device 1200 as may be used in any of the embodiments described herein. In the illustrated embodiment, computing device 1200 includes one or more processors 1210 coupled to a system memory 1220 (which may comprise both non-volatile and volatile memory modules) via an input/ output (I/O) interface 1230. Computing device 1200 further includes a network interface 1240 coupled to I/O interface 1230.

In various embodiments, computing device 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable $I_{SA}$. In multiprocessor systems, each of processors 1210 may commonly, but not necessarily, implement the same $I_{SA}$. In some implementations, graphics processing units (GPUs) may be used instead of, or in addition to, conventional processors.

System memory 1220 may be configured to store instructions and data accessible by processor(s) 1210. In at least some embodiments, the system memory 1220 may comprise both volatile and non-volatile portions; in other embodiments, only volatile memory may be used. In various embodiments, the volatile portion of system memory 1220 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1220 as code 1225 and data 1226.

In some embodiments, I/O interface 1230 may be configured to coordinate I/O traffic between processor 1210, system memory 1220, and any peripheral devices in the device, including network interface 1240 or other peripheral interfaces such as various types of persistent and/or volatile storage devices. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computing device 1200 and other devices 1260 attached to a network or networks 1250, such as other computer systems or devices as illustrated in FIG.

1 through FIG. 15, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may represent one embodiment of a computer-accessible medium configured to store at least a subset of program instructions and data used for implementing the methods and apparatus discussed in the context of FIG. 1 through FIG. 15. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1200 via I/O interface 1230. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1200 as system memory 1220 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 1240. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system comprising:
a quantum key distribution (QKD) network comprising a plurality of QKD nodes, wherein respective ones of the QKD nodes comprise:
a quantum particle receiver; and
a measurement device configured to measure one or more properties of a received quantum particle, wherein respective pairs of the nodes are configured to generate shared QKD key bits based on the measured one or more properties of respective particles and store the shared QKD key bits in a local shared QKD key bit inventory, wherein the shared QKD key bits are known only to respective pairs of the nodes; and
one or more computing devices of the QKD network configured to implement a management service configured to:
receive a request for distribution of a QKD key;
determine a path, comprising one or more links between respective pairs of the QKD nodes of the plurality of QKD nodes that share a local shared QKD key bit inventory, between a QKD node and an additional QKD node of the plurality of QKD nodes, wherein:
the QKD key is to be distributed between the QKD node and the additional QKD node; and
the path comprises one or more intermediate QKD nodes of the plurality of QKD nodes;
select one or more techniques to be used to relay the QKD key, wherein the one or more techniques are selected from a set of techniques comprising at least a first technique using more QKD key bits and a second technique using less QKD key bits, wherein the QKD key bits used are from the local shared QKD key bit inventory of the given pair of nodes; and
cause the one or more selected techniques to be performed to relay the QKD key between respective pairs of nodes along the path.

2. The system of claim 1, wherein the management service is further configured to determine local shared QKD key bit inventory levels of respective pairs of nodes of the plurality of QKD nodes.

3. The system of claim 2, wherein the management service is further configured to:
determine the path based on the respective local shared QKD key bit inventory levels of respective pairs of nodes of the plurality of QKD nodes;
select, for respective links in the path, the first technique based on respective local shared QKD key bit inventory levels of respective pairs of nodes being greater than or equal to a predetermined first inventory threshold; and
select, for respective links in the path, the second technique based on respective local shared QKD key bit inventory levels of respective pairs of nodes being less than or equal to a predetermined second inventory threshold.

4. The system of claim 3, wherein each of the selected one or more techniques is selected on a link-by-link basis.

5. The system of claim 1, wherein the management service is further configured to:
determine a bit consumption rate of QKD key bits of a given pair of nodes of the plurality of QKD nodes;

determine the path based on one or more QKD key bit consumption rates of the given pair of nodes of the plurality of QKD nodes;

select the first technique based on the respective bit consumption rate of the given pair of nodes of the plurality of QKD nodes being less than or equal to a predetermined first bit use rate threshold; and select the second technique based on the respective bit consumption rate of the given pair of nodes of the plurality of QKD node being greater than or equal to a predetermined second bit use rate threshold.

6. The system of claim 5, wherein each of the selected one or more techniques is selected on a link-by-link basis.

7. A method for relaying a key between nodes from a plurality of nodes in a quantum key distribution (QKD) network, the method comprising:

receiving a request for distribution of a key comprising one or more QKD key bits, wherein the one or more QKD key bits are generated from quantum particles measured by respective nodes of the plurality of nodes;

determining a path, comprising one or more links between the respective pairs of nodes, between a node of the plurality of nodes and an additional node of the plurality of nodes, wherein the path comprises one or more intermediate nodes of the plurality of nodes;

selecting one or more techniques to be used to relay the key, wherein the one or more techniques are selected from a set of techniques comprising at least a first technique using more QKD key bits and a second technique using less QKD key bits; and causing a selected technique to be used to relay the key between respective pairs of nodes along the path.

8. The method of claim 7 further comprising determining a QKD key bit demand and a QKD key bit inventory level of a given pair of nodes of the plurality of nodes.

9. The method of claim 8 further comprising determining the path based on the QKD key bit demand or the QKD key bit inventory level of respective given pairs of nodes of the plurality of nodes.

10. The method of claim 9, wherein a technique is selected based on the QKD key bit inventory level and one or more predetermined thresholds.

11. The method of claim 10, wherein an additional technique is selected based on the QKD key bit inventory level and one or more predetermined thresholds.

12. The method of claim 7 further comprising determining a QKD key bit consumption rate of a given pair of nodes of the plurality of nodes.

13. The method of claim 12, wherein the path is determined based on the QKD key bit consumption rate of respective given pairs of nodes of the plurality of nodes.

14. The method of claim 13, wherein a technique is selected based on the QKD key bit consumption rate and one or more predetermined thresholds.

15. The method of claim 14, wherein an additional technique is selected based on the QKD key bit consumption rate and one or more predetermined thresholds.

16. The method of claim 7 further comprising updating the path based on a QKD key bit inventory level of a given pair of nodes of the plurality of nodes.

17. The method of claim 7 wherein the selecting the one or more techniques is performed on a link-by-link basis.

18. One or more non-transitory, computer-readable, storage media storing program instructions, that when executed on or across one or more processors, cause the one or more processors to:

receive a request for distribution of a key comprising one or more QKD key bits, wherein the one or more QKD key bits are generated from quantum particles measured by respective nodes of the plurality of nodes;

determine a path, comprising one or more links between the respective pairs of nodes, between a node of the plurality of nodes and an additional node of the plurality of nodes, wherein the path comprises one or more intermediate nodes of the plurality of nodes;

select one or more techniques to be used to relay the key, wherein the one or more techniques are selected from a set of techniques comprising at least a first technique using more QKD key bits and a second technique using less QKD key bits; and cause a selected technique to be used to relay the key between respective pairs of nodes along the path.

19. The one or more non-transitory, computer-readable storage media of claim 18, wherein the selecting the one or more techniques to be used to relay the key comprises selecting one or more techniques based on a QKD key bit inventory level and one or more predetermined thresholds.

20. The one or more non-transitory, computer-readable storage media of claim 18, wherein the selecting the one or more techniques to be used to relay the key comprises selecting one or more techniques based on a QKD key bit use rate and one or more predetermined thresholds.

* * * * *